(12) United States Patent
Reano et al.

(10) Patent No.: US 11,662,520 B2
(45) Date of Patent: May 30, 2023

(54) FIBER-TO-FIBER PLATFORM FOR MULTI-LAYER FERROELECTRIC ON INSULATOR WAVEGUIDE DEVICES

(71) Applicant: Ohio State Innovation Foundation, Columbus, OH (US)

(72) Inventors: Ronald Reano, Columbus, OH (US); Jonathan Nagy, Columbus, OH (US); Karan Prabhakar, Columbus, OH (US); Ryan Patton, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 93 days.

(21) Appl. No.: 17/205,522

(22) Filed: Mar. 18, 2021

(65) Prior Publication Data
US 2021/0364696 A1 Nov. 25, 2021

Related U.S. Application Data

(60) Provisional application No. 63/026,968, filed on May 19, 2020.

(51) Int. Cl.
*G02B 6/125* (2006.01)
*G02B 6/12* (2006.01)

(52) U.S. Cl.
CPC ......... *G02B 6/125* (2013.01); *G02B 6/12002* (2013.01); *G02B 6/12019* (2013.01); *G02B 2006/12147* (2013.01)

(58) Field of Classification Search
CPC ...... G02B 6/12; G02B 6/125; G02B 6/12002; G02B 6/12019; G02B 2006/12147
See application file for complete search history.

(56) References Cited

U.S. PATENT DOCUMENTS

| | | | |
|---|---|---|---|
| 2018/0284558 A1* | 10/2018 | Miyazaki | G02F 1/2257 |
| 2019/0253776 A1* | 8/2019 | Mazed | G02F 2/004 |
| 2021/0011217 A1* | 1/2021 | Zhang | G02F 1/225 |
| 2021/0364696 A1* | 11/2021 | Reano | G02B 6/125 |

OTHER PUBLICATIONS

Wooten, E. L. et al., "A review of lithium niobate modulators for fiber-optic communications systems," IEEE Journal of Selected Topics in Quantum Electronics 6, 69-82 (2000).
(Continued)

*Primary Examiner* — Tina M Wong
(74) *Attorney, Agent, or Firm* — Meunier Carlin & Curfman LLC

(57) ABSTRACT

A fiber-to-fiber system for multi-layer ferroelectric on insulator waveguide devices is described. The system comprises a fiber-to-chip coupler that couples light from a standard optical fiber to multi-layer ferroelectric on insulator waveguides. The multi-layer ferroelectric on insulator waveguides are integrated with electrodes to implement an optical device, an electro-optical device, or a non-linear optical device, such as an electro-optical modulator, with microwave and optical waveguide crossings compatible with packaging. A second fiber-to-chip coupler outputs the light from the multi-layer ferroelectric on insulator device to a standard optical fiber.

9 Claims, 26 Drawing Sheets

(56) References Cited

OTHER PUBLICATIONS

C. Wang, M. Zhang, X. Chen, M. Bertrand, A. Shams-Ansari, S. Chandrasekhar, P. Winzer, and M. Lončar, "Integrated lithium niobate electro-optic modulators operating at CMOS-compatible voltages," Nature 562, 7725, 101-104 (2018).

Wang, Chenxi, et al. "Investigation of Thermal Treatment Processes for Dissimilar Wafer Bonding." ECS Transactions 77.5 (2017): 143.

L. Chen and R. M. Reano, "Compact electric field sensors based on indirect bonding of lithium niobate to silicon microrings," Optics Express 20, 4032-4038 (2012).

L. Chen, M. G. Wood, and R. M. Reano, "12.5 pm/V hybrid silicon and lithium niobate optical microring resonator with integrated electrodes," Optics Express 22, 27003-27010 (2013).

L. Chen, Q. Xu, M. Wood, and R. M. Reano, "Hybrid silicon and lithium niobate electro-optical ring modulator," Optica 1, 112-118 (2014).

L. Chen, J. Chen, J. Nagy, and R. M. Reano, "Highly linear ring modulator from hybrid silicon and lithium niobate," Optics Express 23, 13255-13264 (2015).

L. Chen, J. Nagy, and R. M. Reano, "Patterned ion-sliced lithium niobate for hybrid photonic integration on silicon," Optical Materials Express 6, 2460-2467 (2016).

J. Nagy and R. M. Reano, "Reducing leakage current during periodic poling of ion-sliced x-cut MgO doped lithium niobate thin films," Optical Materials Express 9, 3146-3155 (2019).

M. G. Wood, L. Chen, J. R. Burr, and R. M. Reano, "Optimization of electron beam patterned hydrogen silsesquioxane mask edge roughness for low-loss silicon waveguides," Journal of Nanophotonics 8, Aug. 30, 1998 (2014).

K. Yap, A. Delage, J. Lapointe, B. Lamontagne, J. Schmid, P. Waldron, B. Syrett, and S. Janz, "Correlation of scattering loss, sidewall roughness, and waveguide width in silicon-on-insulator ridge waveguides," Journal of Lightwave Technology 27, 3999-4008 (2009).

L. He, M. Zhang, A. Shams-Ansari, R. Zhu, C. Wang, and L. Marko, "Low-loss fiber-to-chip interface for lithium niobate photonic integrated circuits," Optics Letters, 44, 2314-2317 (2019).

J. Jian, P. Xu, H. Chen, M. He, Z. Wu, Zhou, L. Liu, Y. Chunchuan, S. Yu, "High-efficiency hybrid amorphous silicon grating couplers for sub-micron-sized lithium niobate waveguides," Optics Express, 26, 29651-29658 (2018).

P. Sun and R. Reano, "Cantilever couplers for intra-chip coupling to silicon photonic integrated circuits," Optics Express 17, 4565-4574 (2009).

M. Wood, P. Sun, and R. M. Reano, "Compact cantilever couplers for low-loss fiber coupling to silicon photonic integrated circuits," Optics Express 20, 164-172 (2012).

\* cited by examiner

☐ Air ▪ Au ▪ SiO₂ ▪ Ti:LiNbO₃ ▪ LiNbO₃ ▪ TiO₂ ▪ Si

☐ Air ▪ Au ▪ SiO₂ ▪ Ti:LiNbO₃ ▪ LiNbO₃ ▪ TiO₂ ▪ Si

☐ Air ▪ Au ▪ SiO₂ ▪ Ti:LiNbO₃ ▪ LiNbO₃ ▪ TiO₂ ▪ Si

300

400

900

950

(1) $\sigma_{rms}$ = 2.1 nm, Lc = 94 nm, air clad
(2) $\sigma_{rms}$ = 2.1 nm, Lc = 94 nm, $SiO_2$ clad
(3) $\sigma_{rms}$ = 0.65 nm, Lc = 38 nm, air clad
(4) $\sigma_{rms}$ = 0.65 nm, Lc = 38 nm, $SiO_2$ clad 1210            1220

1230            1240

☐ Air    ■ Au    ▨ SiO$_2$    ▨ LiNbO$_3$    ▨ Si

1200

1500

1500

1500

1500

1500

1600

SHG efficiency 600% W⁻¹ cm⁻²

SHG efficiency 600% W⁻¹ cm⁻²

FIBER-TO-FIBER PLATFORM FOR MULTI-LAYER FERROELECTRIC ON INSULATOR WAVEGUIDE DEVICES

CROSS-REFERENCE TO RELATED APPLICATIONS

This application claims the benefit of U.S. provisional patent application No. 63/026,968, filed on May 19, 2020, and entitled "FIBER-TO-FIBER PLATFORM FOR MULTI-LAYER FERROELECTRIC ON INSULATOR WAVEGUIDE DEVICES," the disclosure of which is expressly incorporated herein by reference in its entirety.

STATEMENT OF GOVERNMENT SUPPORT

This invention was made with government support under Award No. 1809894 awarded by National Science Foundation. The government has certain rights in the invention.

BACKGROUND

Ferroelectrics such as lithium niobate are workhorse materials for modern optical technologies. Ion-sliced lithium niobate technology has emerged as an enabling platform for electro-optical modulators with half-wave voltage ($V_\pi$) in the range of 5 V and electrical bandwidth in the range of 100 GHz. Traditional bulk lithium niobate electro-optical modulators are based on diffused titanium optical waveguides and microwave electrodes separated from the optical waveguide by a silicon dioxide buffer layer, illustrated in FIG. 1A. The approach can produce 3.5 V $V_\pi$ in a 35 GHz bandwidth. In contrast, emerging approaches utilize optical waveguides based on thin films of lithium niobate on insulator (LNOI). In FIG. 1B, the optical waveguide is formed by strip loading the thin film of lithium niobate with a high index material such as silicon nitride or titanium dioxide. The approach can enable modulators with 6.8 V $V_\pi$ in a 100 GHz bandwidth. A third approach, shown in FIG. 1C, involves etching the thin film of lithium niobate to form ridge waveguides. The silicon dioxide buffer layer is removed and the metal electrodes are placed on the same layer as the lithium niobate. The approach has experimentally achieved 4.4 V $V_\pi$ with a 3 dB bandwidth of 100 GHz in a device length of 5 mm, representing the current state-of-the-art. High optical confinement in the rib waveguide allows for small signal-to-ground gap spacing in the microwave co-planar waveguide geometry. The small spacing allows for strong electro-optical overlap between the microwave field and the optical mode, resulting in high modulation efficiency. In FIG. 1C, the handle for the ion-sliced lithium niobate is a silicon substrate, instead of lithium niobate. The optical mode resides primarily in the lithium niobate rib waveguide, but the microwave mode extends into the silicon substrate. Tuning of the layer thicknesses in the ion-sliced lithium niobate, silicon dioxide, and silicon substrate allows the microwave and optical group velocities to be designed with more flexibility. Consequently, velocity matching can be engineered more easily without reducing the electro-optical overlap. Optical waveguides can be etched with smooth sidewalls, allowing for optical propagation losses of 0.2 dB/cm. Tapered lensed fibers allow for a coupling loss of about 5 dB/facet.

The state-of-the-art modulator, shown in FIG. 1C, does not allow for microwave and optical waveguide crossings. The waveguide crossings are required for packaging the modulator with high-frequency co-axial connectors and with standard telecommunications wavelength optical fiber. One solution is to introduce a buffer layer between the optical waveguide and the metal electrodes, as shown in the approach of FIG. 1B. The buffer layer allows for optical waveguides to pass underneath the metal electrodes. Unfortunately, this approach comes at the expense of increasing the product of the half-wave voltage and the modulation length, $V_\pi L$, because the overlap between the optical mode and the microwave mode is reduced. Another solution is to utilize microwave vias and a second metallization layer. Ultimately, however, as modulation frequency is pushed beyond 100 GHz, the use of microwave vias will be a bandwidth limiting approach due to the inductance introduced.

Furthermore, the state-of-the-art modulator, shown in FIG. 1C, does not produce efficient coupling to standard optical fiber that is required for the insertion of the modulator as a component in a larger system. Non-standard specialty fiber in the form of lensed fibers are used to butt-couple light into and out of the chip. The coupling loss is substantial, about 5 dB per facet, which can be prohibitively large when incorporated into fielded systems.

It is with respect to these and other considerations that the various aspects and embodiments of the present disclosure are presented.

SUMMARY

A fiber-to-fiber system for multi-layer ferroelectric on insulator waveguide devices is described. The system comprises a fiber-to-chip coupler that couples light from a standard optical fiber to multi-layer ferroelectric on insulator waveguides. The multi-layer ferroelectric on insulator waveguides are integrated with electrodes to implement an optical device, an electro-optical device, or a non-linear optical device, such as an electro-optical modulator, with microwave and optical waveguide crossings compatible with packaging. A second fiber-to-chip coupler outputs the light from the multi-layer ferroelectric on insulator device to a standard optical fiber.

In an implementation, a system comprises: a first fiber-to-chip coupler configured to receive light from a first optical fiber; a plurality of multi-layer ferroelectric on insulator optical waveguides; and a second fiber-to-chip coupler configured to output light to a second optical fiber, wherein the multi-layer ferroelectric on insulator waveguides are coupled between the first fiber-to-chip coupler and the second fiber-to-chip coupler.

In an implementation, a system comprises: a first fiber-to-chip coupler configured to receive light from a first optical fiber; a plurality of multi-layer ferroelectric on insulator optical waveguides and non-ferroelectric on insulator waveguides; and a second fiber-to-chip coupler configured to output light to a second optical fiber, wherein the multi-layer ferroelectric on insulator optical waveguides and the non-ferroelectric on insulator optical waveguides are coupled between the first fiber-to-chip coupler and the second fiber-to-chip coupler.

In an implementation, a method comprises: forming a first insulating layer on a handle wafer; implanting a donor wafer with ions to form a damage layer beneath the surface; bonding the donor wafer and the handle wafer; annealing the bonded wafers to exfoliate a first film along the ion implant damage layer; forming a second insulating layer on the first film; implanting a donor wafer with ions to form a damage layer beneath the surface; bonding the donor wafer to the second insulating layer on the first film; and annealing the bonded wafers to exfoliate a second film along the ion implant damage layer.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1A:
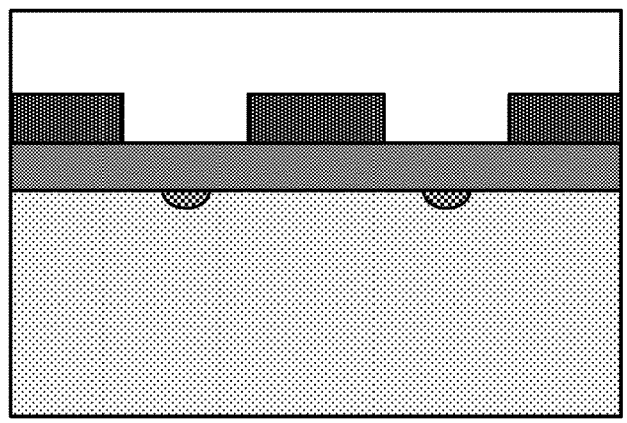
FIGS. 1A, 1B, and 1C are illustrations of various prior art electro-optical modulator cross-sections including conventional Ti-diffused waveguides in bulk $LiNbO_3$; strip loaded ion-sliced $LiNbO_3$ waveguides; and etched ion-sliced $LiNbO_3$ waveguides on Si, respectively.
Figure 1B:
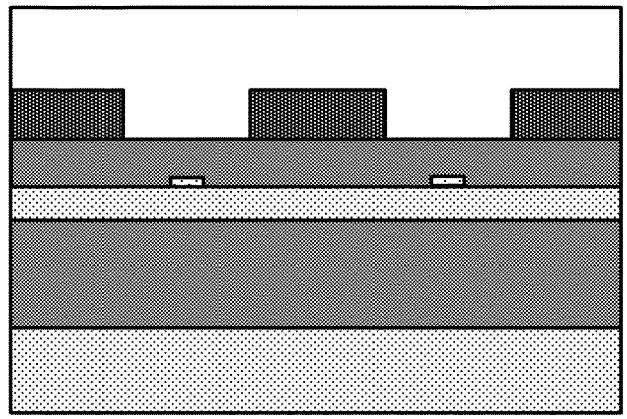
Figure 1C:
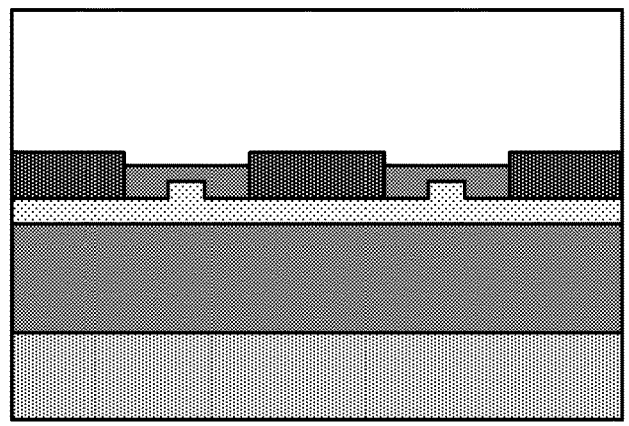

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

As described further herein, an implementation comprises (1) a fiber-to-chip coupler that allows light to be coupled from a standard single mode optical fiber into a lithium niobate on insulator (LNOI) waveguide, (2) multi-layer coupled waveguides that allow light to be coupled vertically from a lithium niobate waveguide on one level to a lithium niobate waveguide on another level, (3) electro-optical and nonlinear optical devices in multi-layer LNOI waveguides, and (4) a second fiber-to-chip coupler that allows light to be coupled from a LNOI waveguide into a standard single mode optical fiber.

Waveguides in a thin layer of a ferroelectric material such as lithium niobate enable efficient wavelength conversion and electro-optical devices due to high spatial confinement of light. Exploiting the high spatial confinement introduces major difficulties, however, when attempting to cross optical waveguides with metal electrodes, and when attempting to couple light from the waveguides to standard optical fiber. Waveguide crossings and coupling to standard optical fiber allow for packaging that is required for field use and/or for using the waveguide device as a component in a larger system. The implementations described herein provide a fiber-to-fiber solution that allows the advantages of LNOI integrated photonic chips to be exploited in real world fielded systems.

Implementations described herein provide the ability to produce fully packaged devices that can be inserted into systems via standard optical fiber used in current computing, communications, and sensing systems. Industry applications include classical and quantum computing, communications, and sensing. For example, electro-optical modulators implemented with aspects described herein meet the need for developing radio frequency (RF) links that operate at frequencies over 100 GHz for ultra-wideband high-dynamic range receivers. In another example, wavelength converters, electro-optic devices, and nonlinear optical devices implemented with aspects described herein meet the need for developing components and transducers that can interconnect quantum bits (qubits) based on, for example, superconducting circuits or trapped ions, to standard optical fiber for creating hybrid quantum networks, distributed quantum computers, and technology for long distance communication over the future quantum internet.

Figure 2:
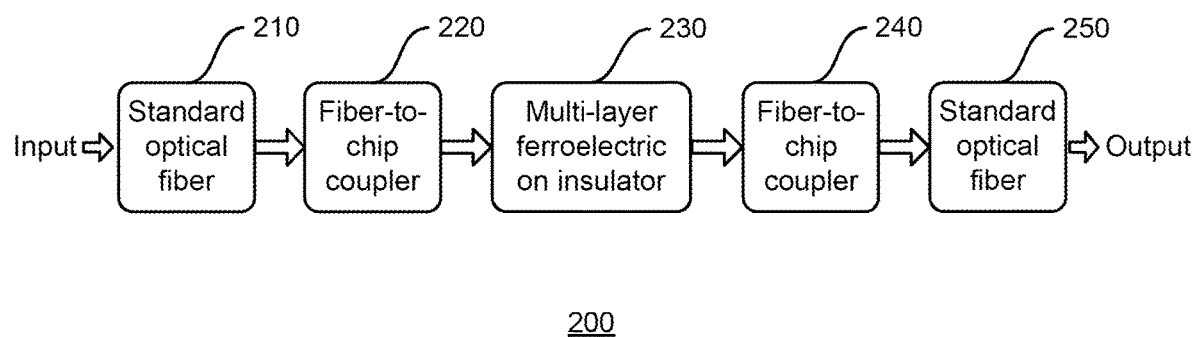
FIG. 2 is an illustration of an implementation of a fiber-to-fiber system for multi-layer ferroelectric on insulator waveguide devices.

A fiber-to-fiber system for multi-layer ferroelectric on insulator waveguide devices is described. FIG. 2 is an illustration of an implementation of a fiber-to-fiber system 200 for multi-layer ferroelectric on insulator waveguide devices. The system 200 comprises a fiber-to-chip coupler 220 that couples light from a standard optical fiber 210 to multi-layer ferroelectric on insulator waveguides 230. The multi-layer ferroelectric on insulator waveguides 230 are integrated with electrodes to implement an optical device, such as an electro-optical modulator, with microwave and optical waveguide crossings compatible with packaging. A second fiber-to-chip coupler 240 outputs the light from the multi-layer ferroelectric on insulator device 230 to a standard optical fiber 250.

Figure 3:
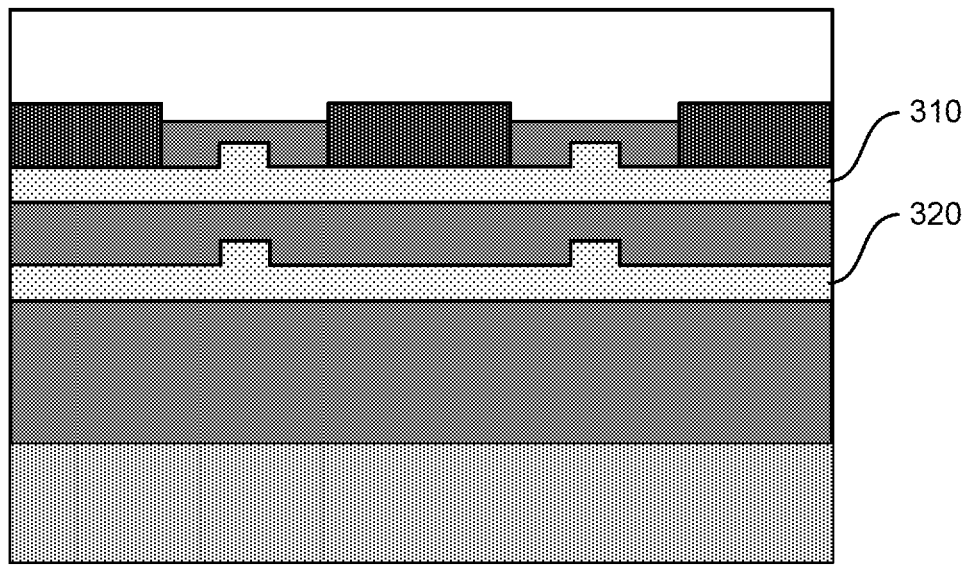
FIG. 3 is an illustration of an implementation of an electro-optical modulator cross-section with multi-layer ion-sliced $LiNbO_3$ waveguides.

The multi-layer approach is illustrated in FIG. 3 for the case where the ferroelectric material is lithium niobate. FIG. 3 is an illustration of an implementation of an electro-optical modulator 300 cross-section with multi-layer ion-sliced $LiNbO_3$ waveguides. The multi-layer approach introduces a second optical waveguide layer to allow for optical waveguide routing underneath the metal electrodes. Optical light in the top waveguide layer 310 is coupled vertically downward to the bottom waveguide layer 320 via vertical directional coupling. Similarly, optical light in the bottom waveguide layer 320 is coupled vertically upward to the top waveguide layer 310 via vertical directional coupling. Light in one waveguide layer can couple to the other waveguide layer in a short longitudinal distance when the waveguides are in close vertical proximity.

Figure 4A:
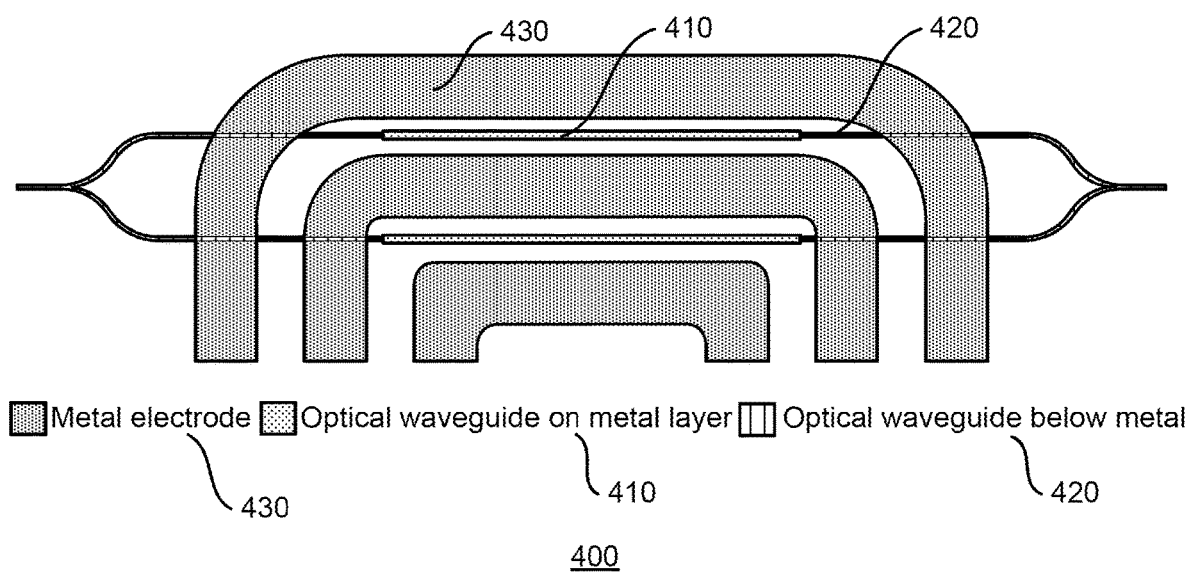
FIG. 4A shows a top-down view of an implementation of an electro-optical modulator with multi-layer optical waveguides.
Figure 4B:
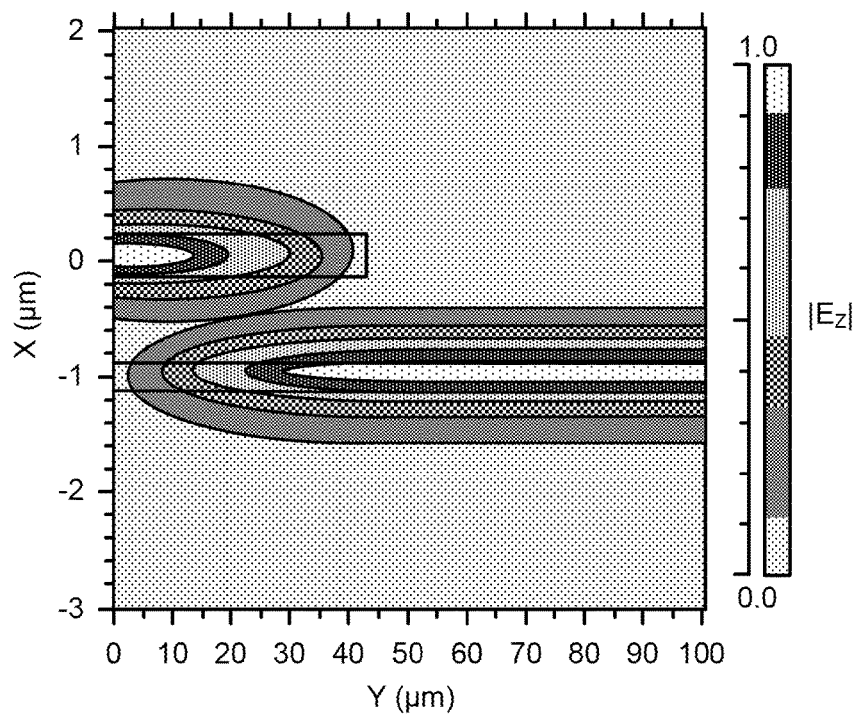
FIG. 4B shows optical modeling of vertical coupling between waveguides.

FIG. 4A shows a top-down view of an implementation of an electro-optical modulator with multi-layer optical waveguides, and FIG. 4B shows optical modeling of vertical coupling between waveguides. For specificity, the multi-layer waveguide cross-section is that of FIG. 3, the optical wavelength is 1550 nm, the rib waveguide width is 1350 nm, the rib waveguide height is 100 nm, the rib waveguide slab height is 250 nm, the buried oxide is 4000 nm, and the vertical center-to-center spacing between waveguides is 1000 nm.

In FIG. 4A, a top-down schematic of the electro-optical modulator 400 is shown with optical waveguides on the metal layer 410 for low $V_\pi L$ and optical waveguides below the metal layer 420 for routing underneath the metal electrodes 430. Optical modeling, shown in FIG. 4B, shows that vertical coupling occurs over a length of 43 μm for a vertical gap of 1 μm, allowing for clearance from metal electrodes. The optical propagation loss from the metal (gold) for 1550 nm light in the bottom waveguide is only 0.95 dB/cm.

The top-down view of the electro-optical modulator 400 in FIG. 4A illustrates that the systems and methods described herein allows for packaging of the chip with west-to-east input and output optical fibers, and south input/output microwave connectors electrically connected to the co-planar waveguide electrodes. North/south sides of the packaging can be used for high-frequency and DC electrical connections to the chip.

Figure 5A:
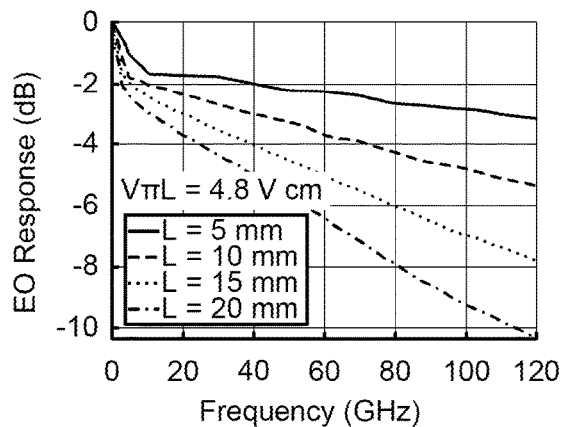
FIGS. 5A-5F shows modeling results of an implementation of an electro-optical modulator: electro-optical (EO) response (FIG. 5A), RF Loss (FIG. 5B), RF effective index (FIG. 5C), real part of $Z_o$ (FIG. 5D), imaginary part of $Z_o$ (FIG. 5E), and RF group index (FIG. 5F)
Figure 5B:
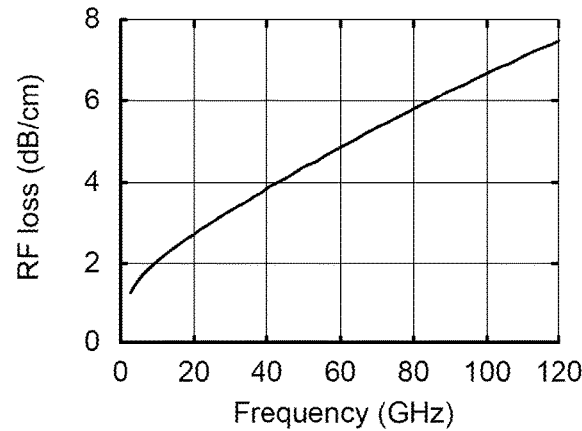
Figure 5C:
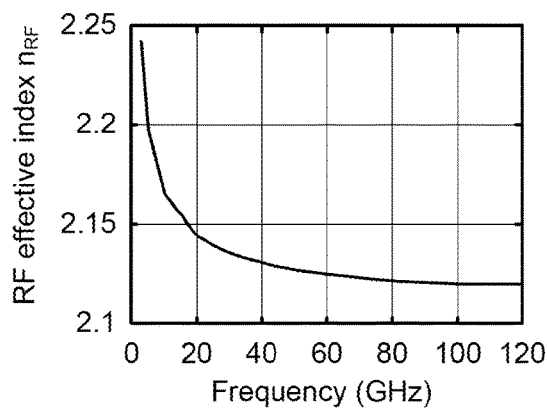
Figure 5D:
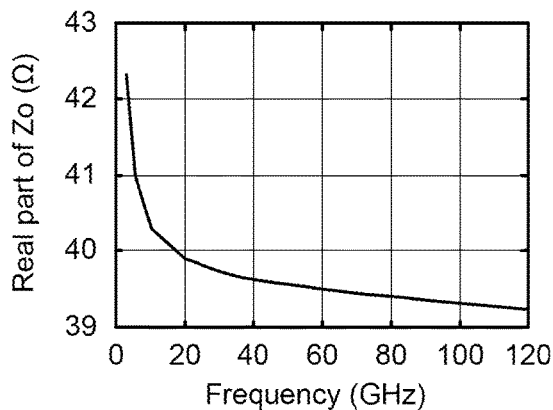
Figure 5E:
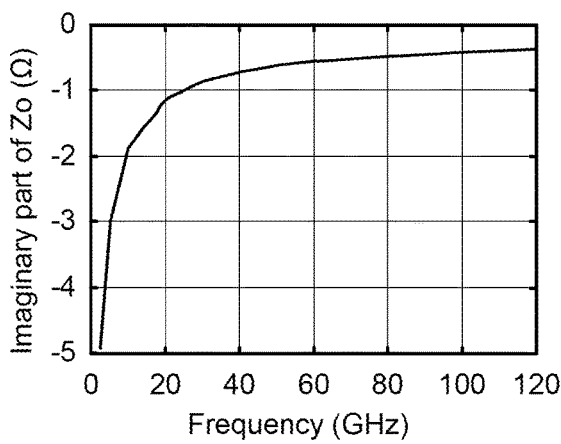
Figure 5F:
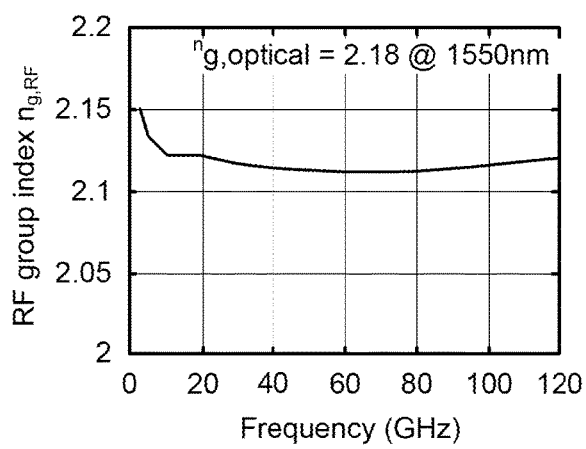

FIGS. 5A-5F shows modeling results of an implementation of an electro-optical modulator: electro-optical (EO) response (FIG. 5A), RF Loss (FIG. 5B), RF effective index (FIG. 5C), real part of $Z_o$ (FIG. 5D), imaginary part of $Z_o$ (FIG. 5E), and RF group index (FIG. 5F). For specificity, the optical wavelength is 1550 nm, the rib waveguide width is 1350 nm, the rib waveguide height is 100 nm, the rib waveguide slab height is 250 nm, the buried oxide is 4000 nm, the metal height is 1100 nm, the center electrode width is 40 μm, the co-planar waveguide lateral gap spacing is 6.35 μm, and the finite ground width of the co-planar waveguide is 120 μm.

The finite element method was utilized using COMSOL™ to establish expected modulator performance, shown in FIGS. 5A-5F. A $V_\pi L$ of 4.8 V cm and 110 GHz 3 dB bandwidth are expected in a modulator length of 5 mm. At 110 GHz, the RF loss is 7 dB/cm, the RF CPW mode effective index is 2.12, the characteristic impedance (Zo) is 39.3Ω, and the RF group index is 2.12. At 1550 nm wavelength, the optical group index is 2.18. The modulator performance meets the need for developing radio frequency (RF) links that operate at frequencies up to 110 GHz for ultra-wideband high-dynamic range receivers.

Figure 6:
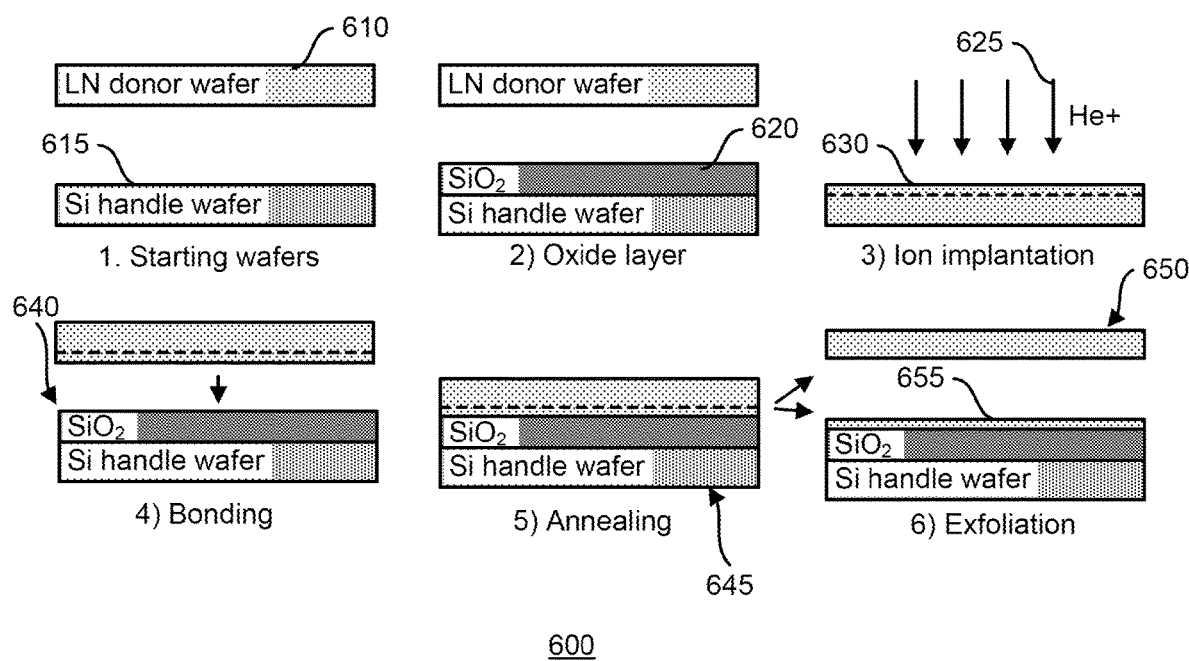
FIG. 6 shows a diagram of an implementation of a fabrication process for lithium niobate on insulator on a silicon handle wafer.

FIG. 6 shows a diagram of an implementation of a fabrication process 600 for lithium niobate on insulator on a silicon handle wafer. Ion-slicing is used to realize LNOI. For specificity, the ion-sliced LN thickness is 800 nm. As illustrated in FIG. 6, the process starts with a lithium niobate (LN) donor wafer 610 and a silicon handle wafer 615. The silicon wafer is oxidized to produce a silicon dioxide ($SiO_2$) layer 620. The donor wafer is implanted with $He^+$ ions 625 to form a damage layer 630 below the +x surface. The depth of the damage layer 630 depends on the implantation energy and is calculated using Monte Carlo simulations. After implantation, both wafers are bonded 640 at room temperature. The bonded wafers are then annealed 645 to exfoliate 650 a film 655 along the ion implant damage layer. The top surface of the lithium niobate thin film 655 is polished to reduce surface roughness using, for example, chemical mechanical polishing techniques. In an implementation, magnesium oxide (MgO) doped LN thin film (MgO:LNOI) on LN handle over a 3" wafer may be fabricated. Furthermore, the donor and/or handle wafers could be implemented as dies instead of as full wafers.

Bonding to a silicon substrate is advantageous for electronic-photonic integration but is challenging because of debonding and cracking due to thermal expansion coefficient (TEC) mismatch between Si and LN. Fabrication of ion sliced LNOI on a Si handle wafer is achieved here by selecting optimized wafer thicknesses informed by structural modeling and accommodating for dissimilar wafer bows using a bonding apparatus.

Figure 7:
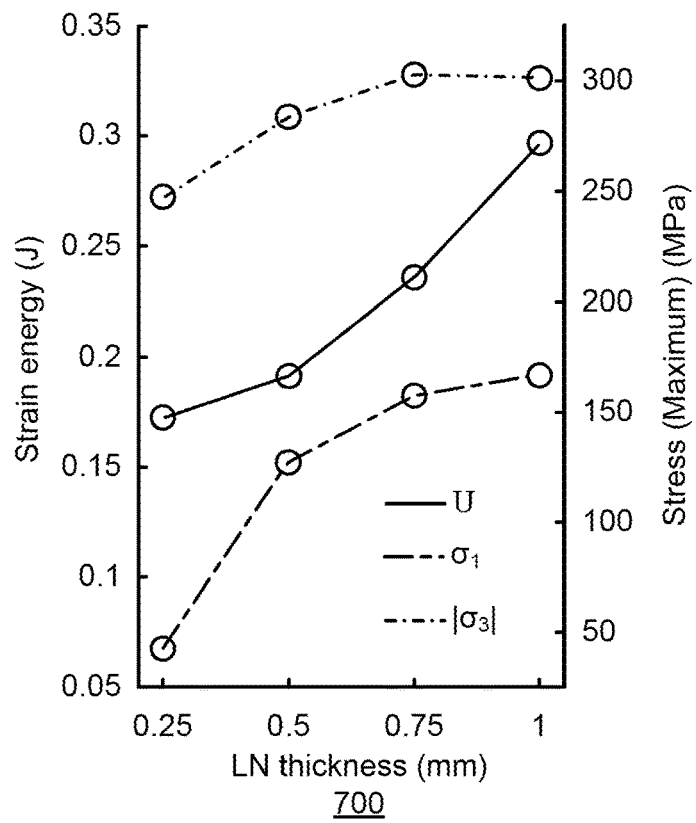
FIG. 7 is an illustration of computed total strain energy U, principal normal stress n, and principal in-plane stress $\sigma_3$ of the LN wafer versus thickness at 190° C.

FIG. 7 is an illustration 700 of computed total strain energy U, principal normal stress $\sigma_1$, and principal in-plane stress $\sigma_3$ of the LN wafer versus thickness at 190° C. FIG. 7 shows an LN-oxide-Si structural finite element analysis of strain energy and stress, due to thermal expansion coefficient (TEC) mismatch at elevated temperatures, in the absence of $He^+$ implantation. The LN donor wafer and Si substrate diameters are 3 and 4 inches, respectively, and the oxide is 4 μm thick. High strain energy and stress can result in debonding and cracking, respectively. The analysis in FIG.

7 shows that thinner LN wafers are expected to be more robust at elevated temperatures required for exfoliation.

Figure 8:
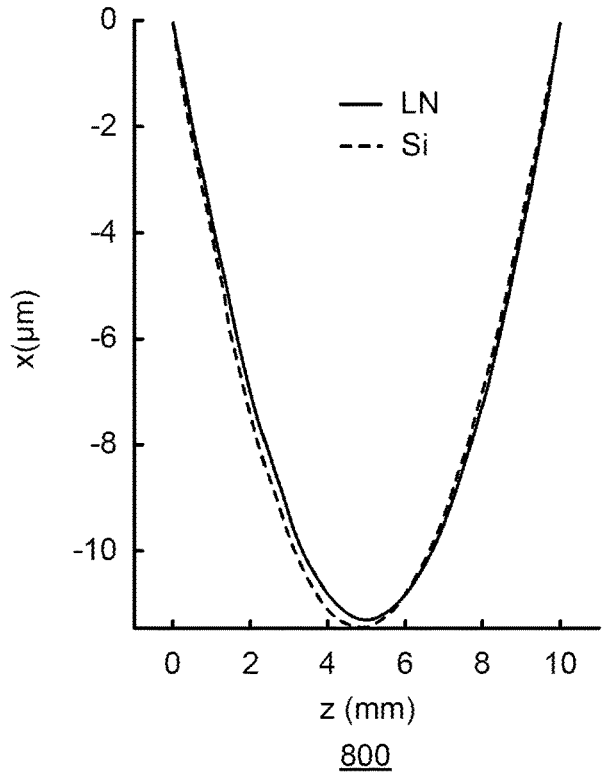
FIG. 8 shows surface profilometry measurements of the LN donor and the deformed silicon handle wafer.
Figure 9A:
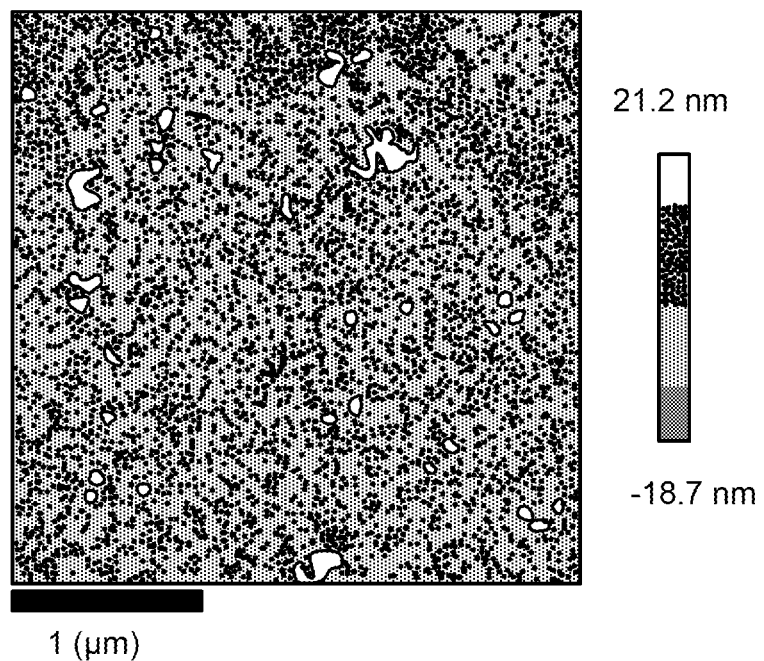
FIGS. 9A and 9B show atomic force microscopy scans of surface and edge, respectively, of ion-sliced LN bonded to oxidized silicon wafer.
Figure 9B:
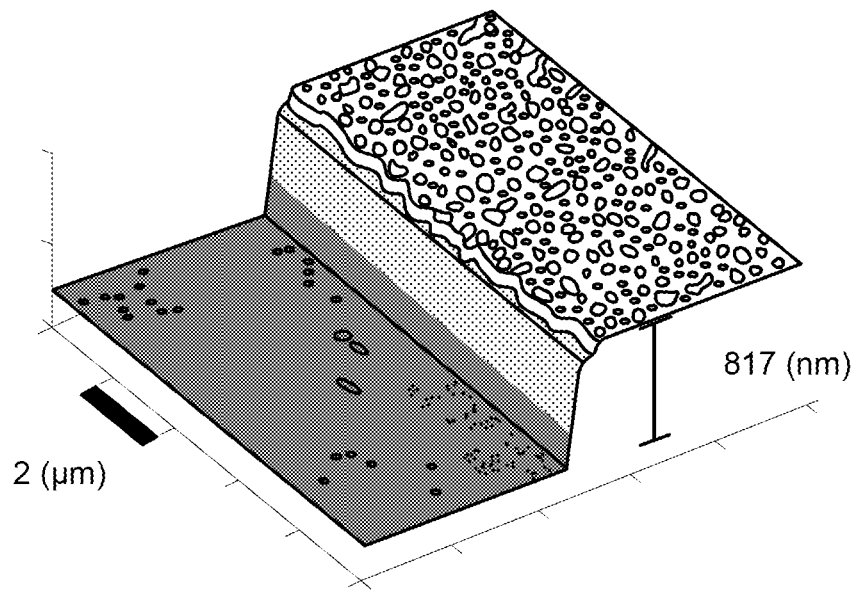
Figure 10:
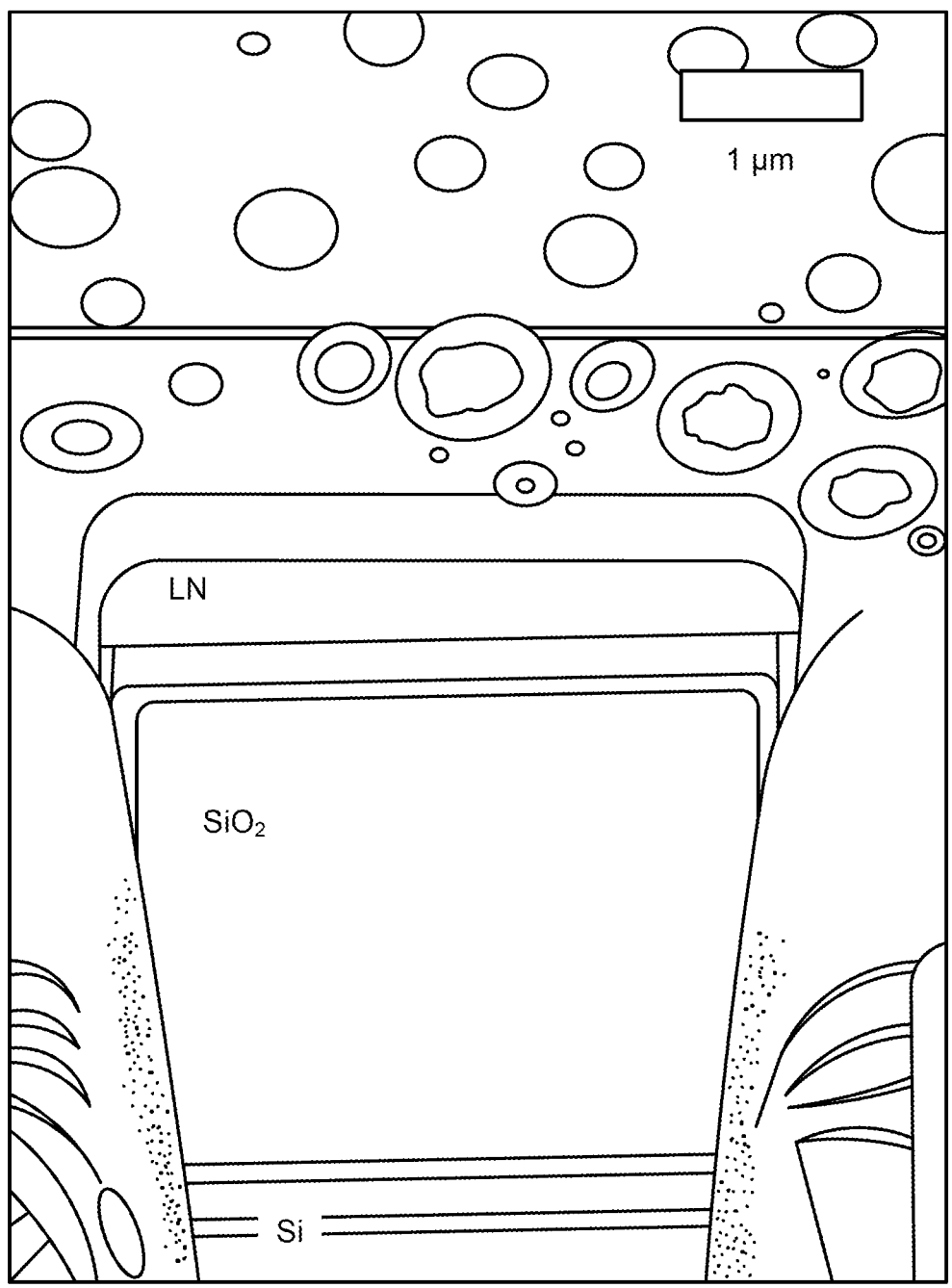
FIG. 10 shows a cross-sectional scanning electron micrograph of LNOI on Si prior to chemical mechanical polishing.

For ion-slicing, an x-cut LN donor substrate of 0.25 mm thickness is implanted with $He^+$ ions at 225 keV with a fluence of $3.5 \times 10^{16}$ $cm^{-2}$. A die of implanted LN and a thermally oxidized Si handle wafer are cleaned using wet chemistry and directly bonded at room temperature. Thin implanted LN exhibits large wafer bow, which is not ideal for bonding, relative to the bow of thick implanted LN. Bonding of the 0.25 mm thick LN die is facilitated, however, though a jig that deforms the Si handle to match the bow of the LN sample, verified by surface profilometry 800 shown in FIG. 8. FIG. 8 shows surface profilometry measurements of the LN donor and the deformed silicon handle wafer. The bonded pair is annealed at 188° C. to exfoliate and transfer the LN thin film onto the oxidized Si wafer. Successful cm-scale film transfer is achieved. FIGS. 9A and 9B show atomic force microscopy scans 900, 950 of surface and edge, respectively, of ion-sliced LN bonded to oxidized silicon wafer. FIGS. 9A and 9B show a root mean square surface roughness of 5.6 nm and a transferred LN film thickness of 817 nm, measured by atomic force microscopy. Film thickness measurements agree with Transport of Ions in Matter (TRIM) calculations of 807 nm. A scanning electron micrograph 1000 of fabricated LNOI is shown in FIG. 10. FIG. 10 shows a cross-sectional scanning electron micrograph of LNOI on Si prior to chemical mechanical polishing (CMP). The CMP process planarizes the LN to sub-nanometer root mean square surface roughness, which removes the effect of helium blistering that is visible on the surface of the LN in FIG. 10.

Figure 11A:
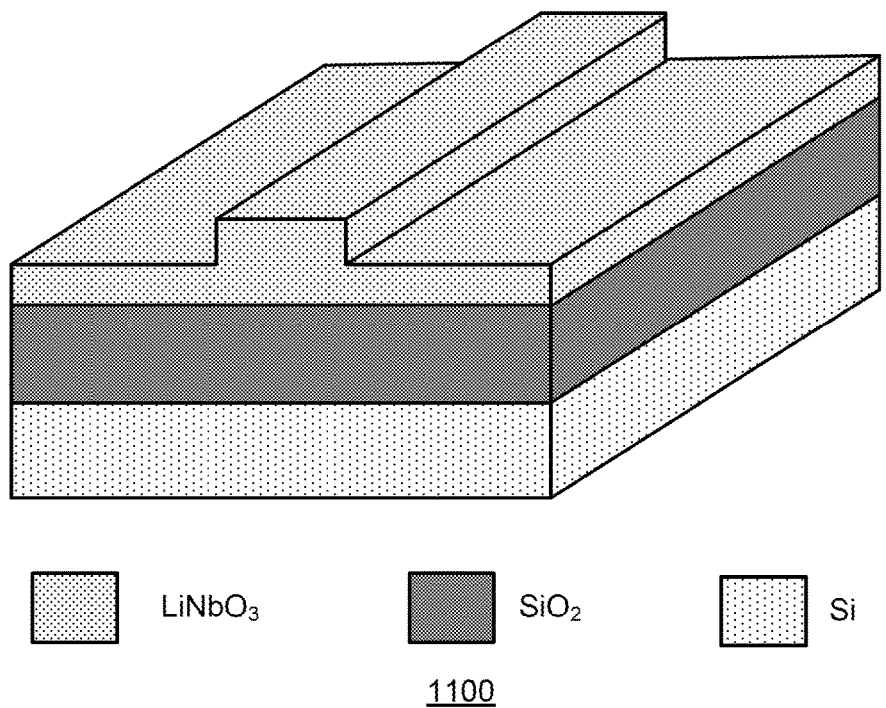
FIG. 11A shows an illustration of an etched lithium niobate rib.
Figure 11B:
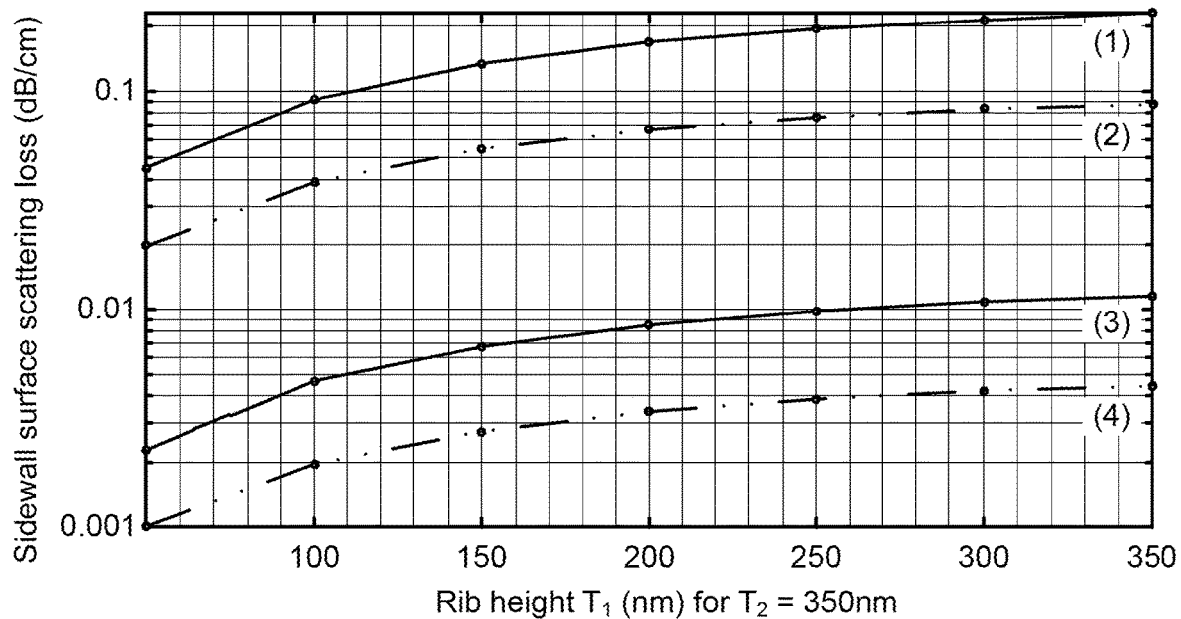
FIG. 11B shows expected optical propagation loss for etched LNOI rib waveguides.

Etching of the thin film of lithium niobate is used to form, for example, rib or strip waveguides. Lithium niobate is etched via plasma etching using, for example, Ar and $CHF_3$ chemistry. An illustration 1100 of an etched lithium niobate rib is shown in FIG. 11A. FIG. 11B shows expected optical propagation loss for etched LNOI rib waveguides with rib height ($T_i$) as parameter. $T_2$ is the unetched lithium niobate thin film thickness. Rib width is 1350 nm. The wavelength is 1550 nm. As shown in FIG. 11B, a sidewall surface scattering loss of less than 0.1 dB/cm is estimated. Optimization of the surface roughness is likely bound by the surface roughness of etch masks. With processing optimization, it is expected to be able to achieve an optical waveguide propagation loss of 0.1 dB/cm or less.

Patterned metal electrodes may be used to form an electro-optical modulator. Gold is deposited on the etched lithium niobate rib waveguides and then patterned to form metal electrodes. Microwave modeling is conducted to design the electrodes. Optical modeling is conducted to design the waveguides. Both models are integrated to design electro-optical overlap. Based on modeling, it is expected to be able to achieve $V_\pi L < 5$ V cm, 100 GHz EO bandwidth for 5 mm modulation length, and 35 GHz EO bandwidth for 10 mm modulation length in fabricated devices.

Figure 12:
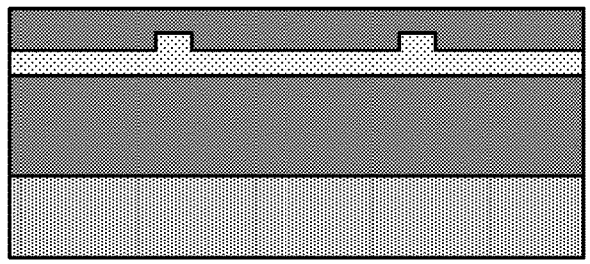
FIG. 12 shows an implementation of a process flow to realize multi-layer ion-sliced lithium niobate waveguides.
Figure 12:
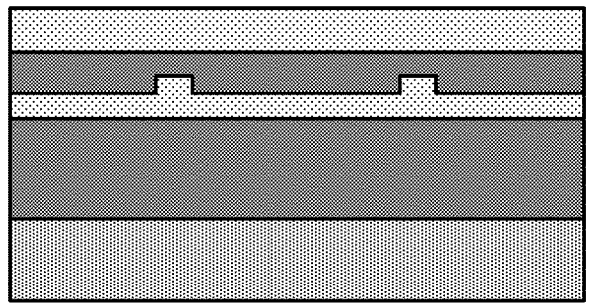
Figure 12:
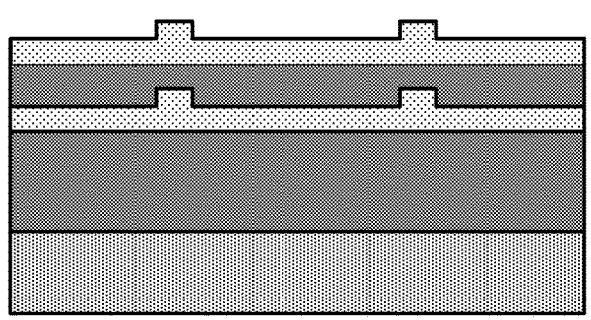
Figure 12:
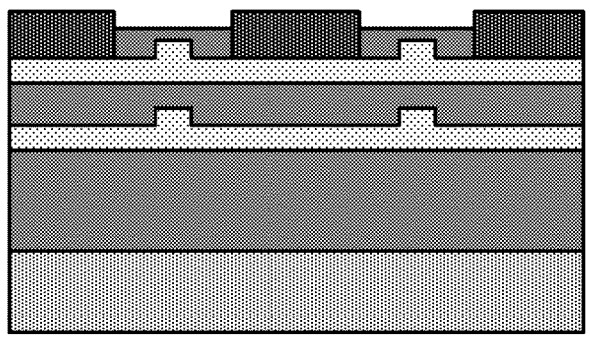

Fabrication of multi-layer ion-sliced lithium niobate waveguides is described. FIG. 12 shows an implementation of a process flow 1200 to realize multi-layer ion-sliced lithium niobate waveguides. Start at 1210 by depositing an insulating film such as plasma enhanced chemical vapor deposition (PECVD) silicon dioxide on top of etched lithium niobate rib waveguides. The surface is then planarized by chemical mechanical polishing. Next, at 1220, a second donor wafer is ion-implanted and bonded to the planarized silicon dioxide. After annealing and exfoliation, the second ion-sliced lithium niobate thin film is patterned and etched at 1230 to form the top layer of rib waveguides. At 1240, a metal such as gold is deposited and electrodes are patterned.

Optical lithography allows for a layer-to-layer alignment on the order of 250 nm and electron beam lithography allows for layer-to-layer alignment on the order of 50 nm. Modeling shows negligible insertion loss for no lateral offset error and 0.31 dB excess insertion loss for a lateral offset error of 250 nm. For specificity, the optical wavelength is 1550 nm, the rib waveguide width is 1350 nm, the rib waveguide height is 100 nm, the rib waveguide slab height is 250 nm, the buried oxide is 4000 nm, and the vertical center-to-center spacing between waveguides is 1000 nm. Bonding processes and annealing temperatures are optimized such that the first layer of lithium niobate waveguides withstands the stresses involved during fabrication of the second layer of waveguides, and electrodes, on top. Characterization of the efficiency of vertical directional coupling over a range of devices that are fabricated within the 250 nm alignment tolerance is accomplished using optical throughput measurements. A vertical directional coupler insertion loss ≤0.5 dB in fabricated devices is expected.

Figure 13:
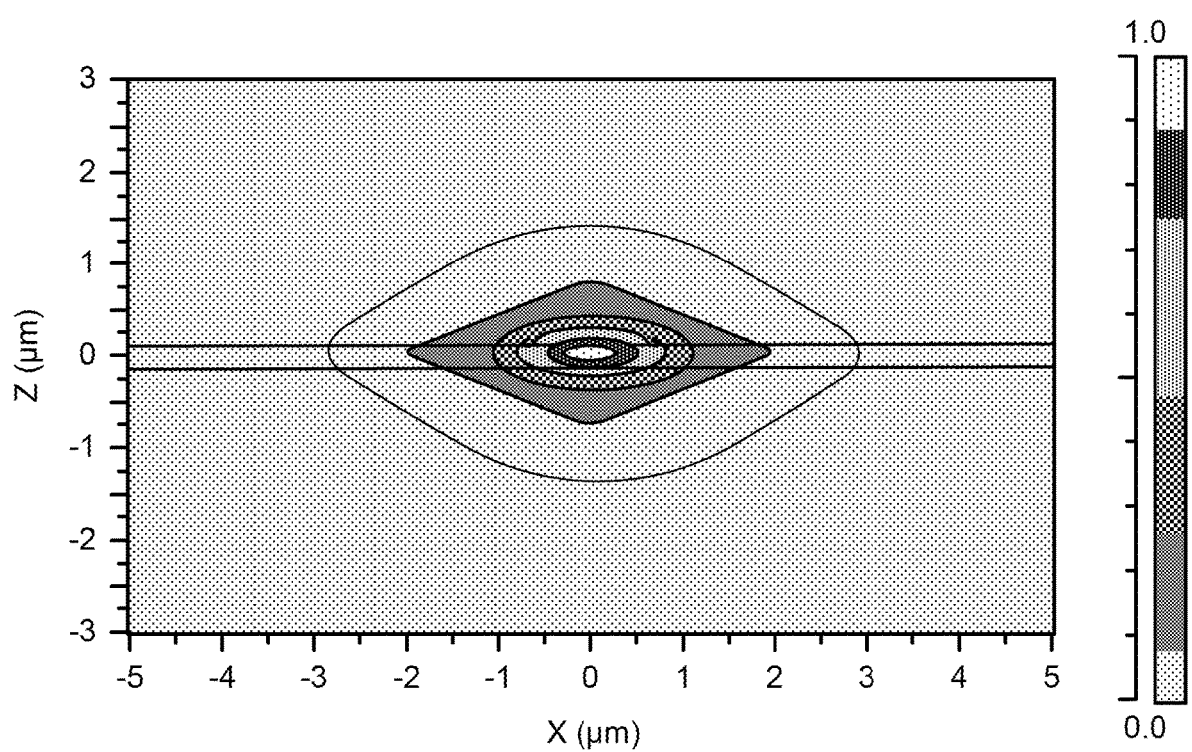
FIG. 13 shows a fundamental mode in an LNOI waveguide obtained via a semi-vector beam propagation method at 1550 nm wavelength.

A fiber-to-chip coupler is described. The high confinement enabled by thin films of lithium niobate produces high performance electro-optical and nonlinear optical waveguide devices but also introduces major challenges when attempting to efficiently couple light between lithium niobate waveguides and optical fibers. Large coupling losses are the result of effective index mismatch, mode size mismatch, and mode field distribution mismatch between a standard optical fiber and a waveguide mode in lithium niobate on insulator. While the mode field diameter of optical fiber at 1550 nm wavelength is on the order of 10 μm, the mode field diameter of a waveguide mode in LNOI is on the order of one micrometer. FIG. 13 shows a fundamental mode in an LNOI waveguide obtained via a semi-vector beam propagation method. For specificity, the optical wavelength is 1550 nm, the rib waveguide width is 1350 nm, the rib waveguide height is 100 nm, the rib waveguide slab height is 250 nm, and the buried oxide is 4000 nm.

Current methods designed to achieve efficient fiber-to-chip coupling generally involve edge coupling using lensed fibers or surface coupling using grating couplers with standard fibers. Lensed fibers improve the edge coupling but are non-standard fibers and require an air gap between the lensed fiber and the chip. Furthermore, the edge of the chip needs to be cleaved and polished. Alternatively, grating couplers used with standard fibers enable light coupling via the surface of the chip without the need for cleaving and polishing. They require, however, a tradeoff between bandwidth and efficiency.

Design and fabrication of a fiber-to-chip coupler is described. Here, the concept of cantilever couplers is adapted to ferroelectric on insulator material systems with some changes. First, the optical fiber is no longer a tapered optical fiber and is instead a standard (SMF-28) cleaved optical fiber. The change removes the requirement for specialty optical fiber. Second, a fiber alignment slot is integrated into the cantilever design to allow for in-line alignment and for the permanent packaging of the optical fiber to the cantilever via epoxy, UV cured optical adhesive, or index matching adhesive. Third, the coupler design is changed to a rib waveguide design, instead of a strip waveguide design.

Figure 14:
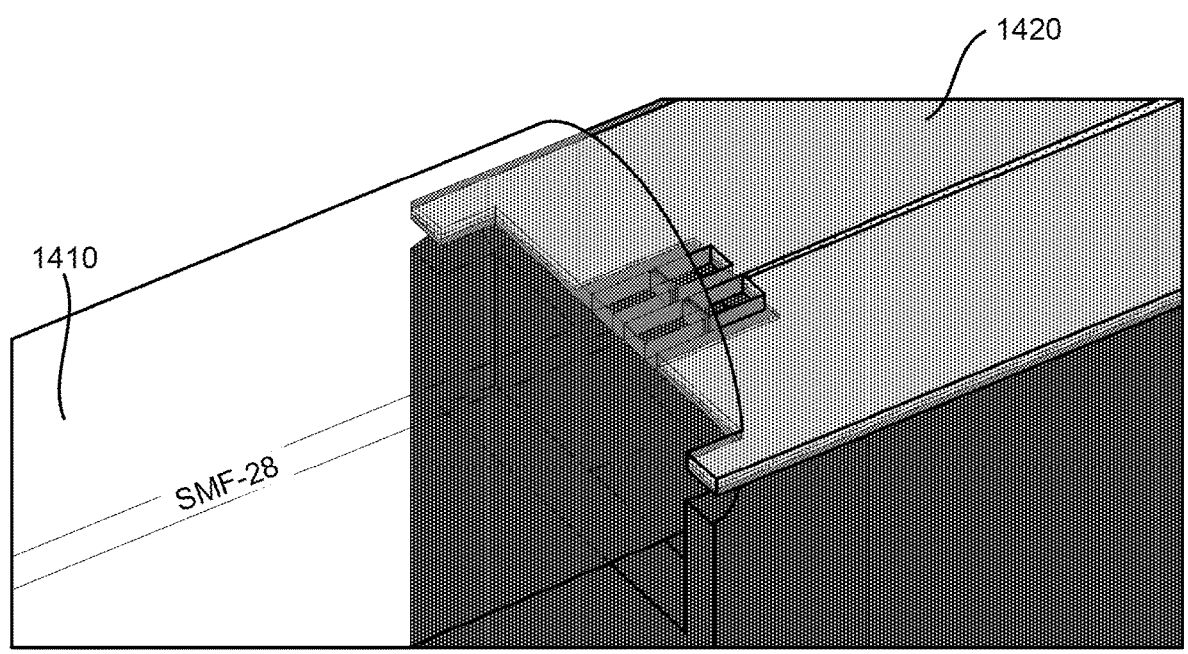
FIG. 14 shows an example fiber-to-chip coupler.
Figure 15A:
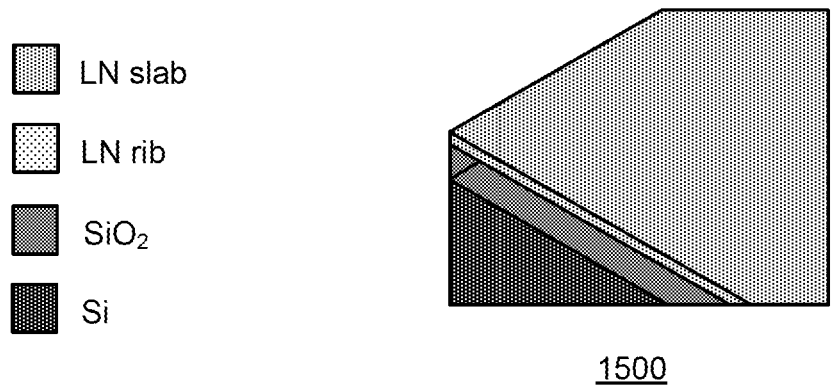
FIG. 15 shows an implementation of a fiber-to-chip coupler fabrication process.
Figure 15B:
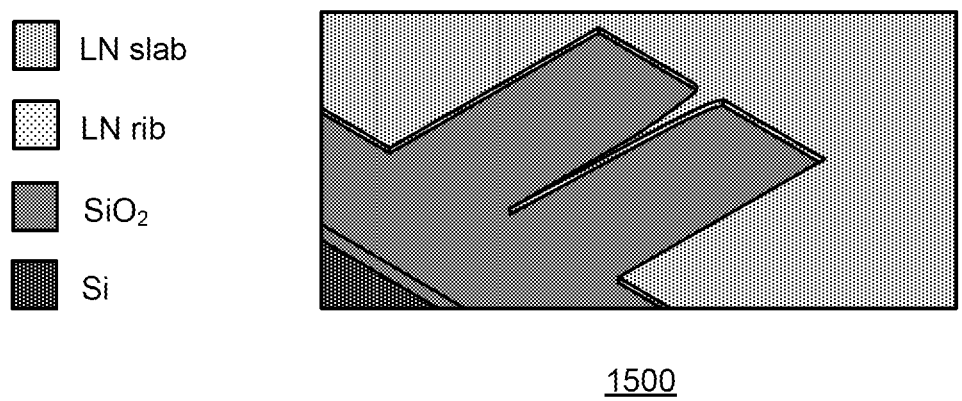
Figure 15C:
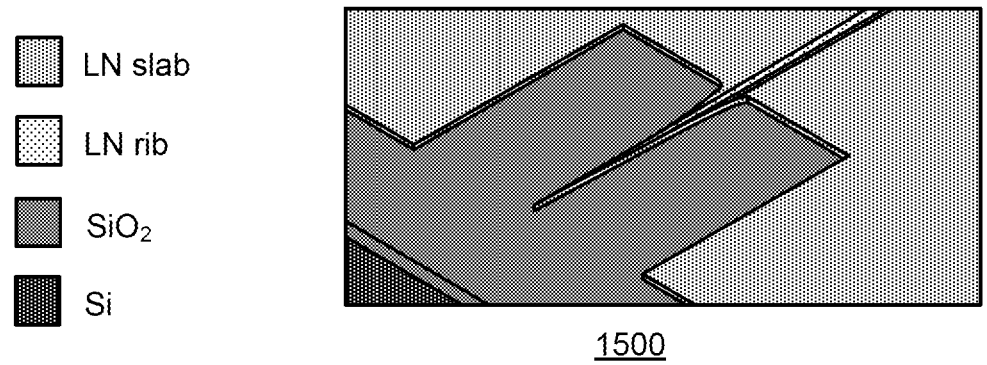
Figure 15D:
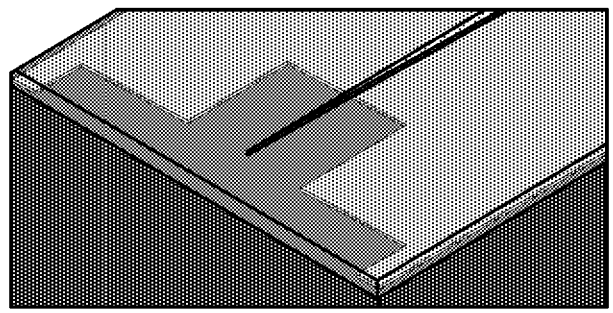
Figure 15E:
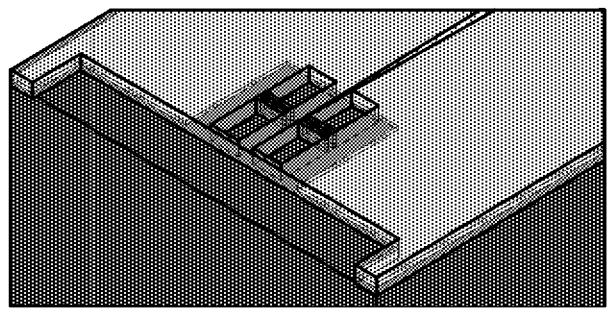
Figure 15F:
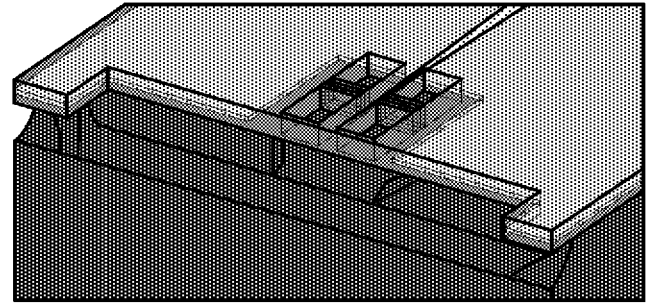
Figure 15G:
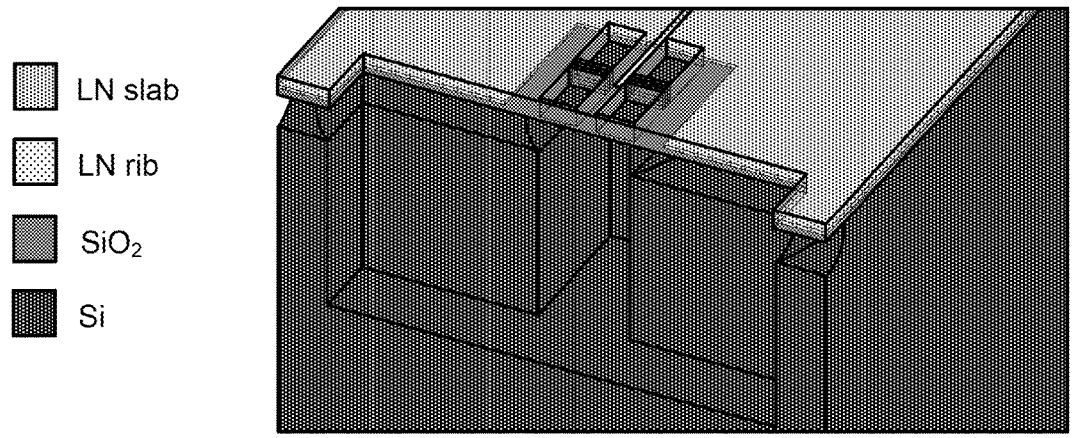
Figure 15H:
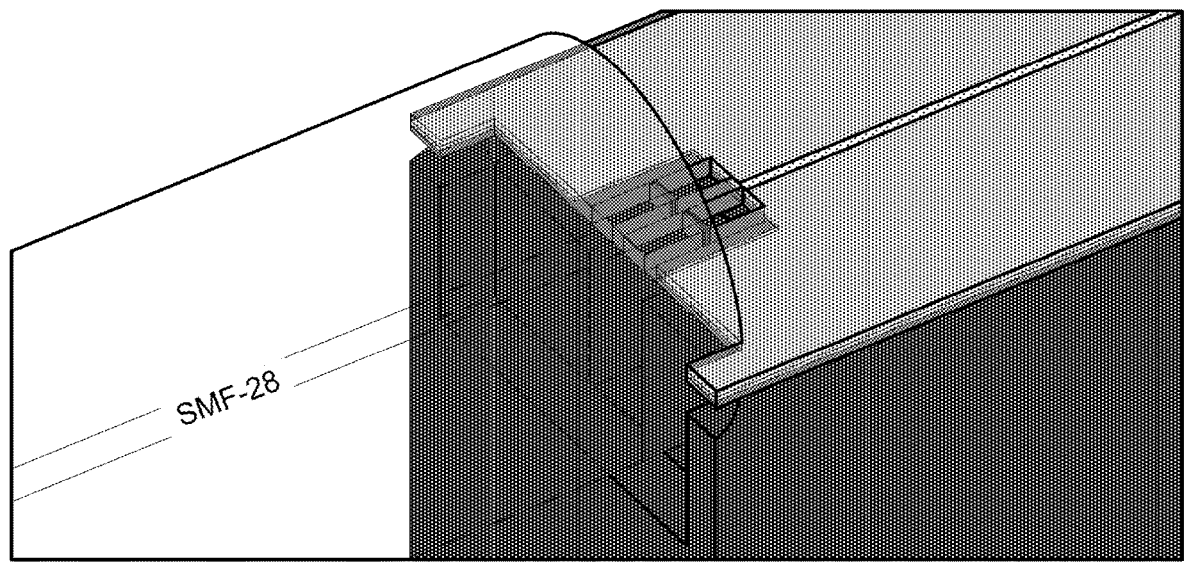

An example fiber-to-chip coupler 1400 is shown in FIG. 14. The coupler allows the use of standard SMF-28 fibers, or standard polarization maintaining fibers, to efficiently couple light into ferroelectric on insulator waveguides. Starting at the far left of the diagram, an SMF-28 single mode fiber 1410 is edge coupled to the ferroelectric on insulator chip 1420. A groove is patterned in the handle wafer to provide alignment and fixation of the optical fiber to the fiber-to-chip coupler cantilever. The fiber-to-chip coupler 1400 is a suspended inverse-width taper ferroelectric on insulator waveguide encapsulated in a silicon dioxide cantilever.

FIG. 15 shows an implementation of a fiber-to-chip coupler fabrication process flow 1500 in the context of lithium niobate on insulator waveguides. The first step is to begin with a lithium niobate (LN) thin film bonded to an oxidized silicon wafer, illustrated in (a). The second step, shown in (b), is to fully etch the LN thin film to form an inverse width slab taper via lithography and plasma etching. The slab taper width increases, following a curve designed to optimize coupling efficiency. Near the edge of the chip, a notch in the LN is etched to assist in fiber alignment. The third step, shown in (c), is to pattern a LN tapered rib on top of the LN slab. The rib is aligned to the tapered slab. The rib taper width increases, following a curve designed to optimize coupling efficiency. Together, the tapered slab and the tapered rib form a tapered LN rib waveguide. The fourth step, shown in (d), is to deposit silicon oxide via plasma enhanced chemical vapor deposition (PECVD). The PECVD silicon oxide covers the entire wafer and serves as a top waveguide cladding. The fifth step, shown in (e), is to etch silicon oxide pits to form an oxide cantilever that encloses the tapered LN rib waveguide. In this step, PECVD silicon oxide and thermal oxide, from the oxidized silicon wafer, are etched using plasma etching to define the cantilever, support struts for the cantilever, and the optical fiber notch. The cantilever terminates in the optical fiber notch. A short offset distance is present from the end of the LN ridge to the end of the cantilever. The sixth step, shown in (0 is to isotropically etch the silicon substrate to undercut the silicon oxide. The undercut forms a free-standing oxide cantilever with the tapered silicon rib embedded. The mechanical struts on the side of the cantilever are optional. The seventh step, shown in (g), is a further deep etch of the silicon to allow for edge coupling and alignment using standard SMF-28 fiber at the end notch, as shown in (h).

Figure 16:
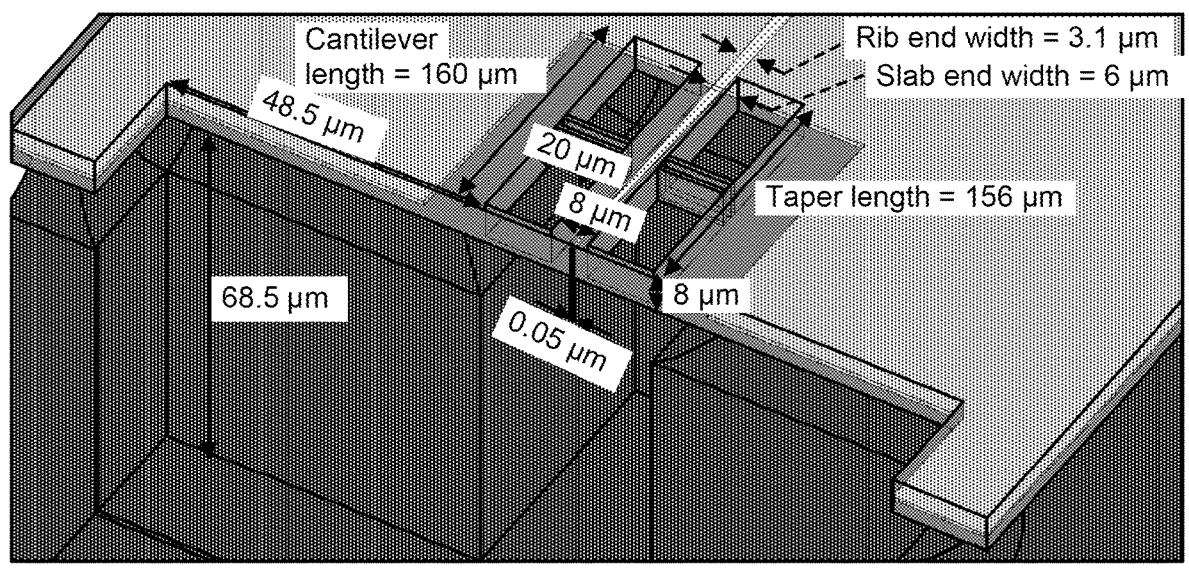
FIG. 16 shows physical dimensions for a representative design of a fiber-to-chip coupler.

FIG. 16 shows physical dimensions for a representative design of a fiber-to-chip coupler 1600. The LN thin film thickness is 600 nm, the thickness of the thermal silicon dioxide layer is 4 μm, and the thickness of the silicon handle wafer is 500 μm. The length of the slab taper is 156 μm. The smallest width of the slab taper is 50 nm. The slab taper width increases, following a third order Bezier curve, to a width of 6 μm. The width of the notch is 145 μm. The LN tapered rib is 200 nm tall on top of the LN slab. The smallest dimension of the rib taper is 50 nm. The rib taper width increases, following a third order Bezier curve, to a width of 3.1 μm. The deposited PECVD silicon oxide is 4 μm. The offset distance from the end of the LN ridge to the end of the cantilever is 4 μm. The total cantilever length is 160 μm. The cantilever width is 8 μm. The pits are 20 μm wide laterally in the direction perpendicular to the longitudinal axis of the rib. The depth of the notch is 68.5 μm, measured from the Si/SiO$_2$ interface.

Figure 17:
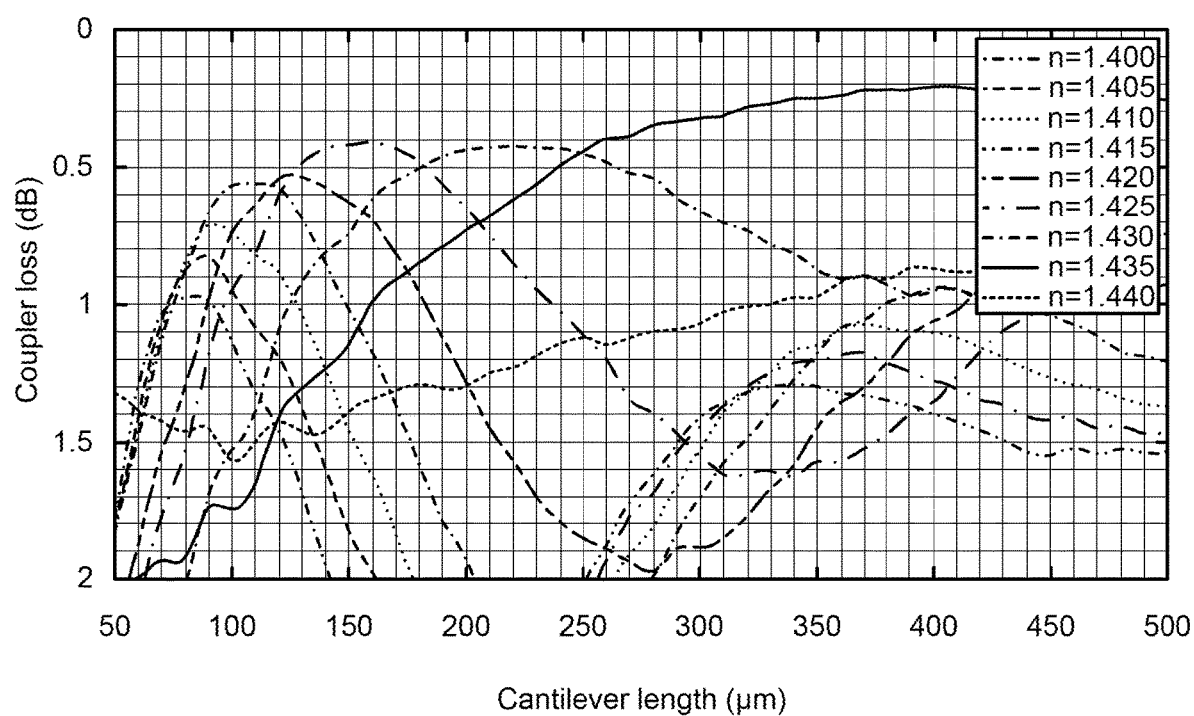
FIG. 17 shows three-dimensional modeling of a fiber-to-chip coupling loss versus cantilever length with refractive index as a parameter.

Modeling and simulation of a representative design of a fiber-to-chip coupler is described. To couple via standard SMF-28 fiber, the cantilever pits are filled with commercially available index matching fluid with a refractive index of 1.425 at 1550 nm wavelength. The refractive index contrast to SiO$_2$ at 1550 nm wavelength is 0.02 given a refractive index of 1.445 for SiO$_2$ at 1550 nm wavelength. Numerical modeling using three-dimensional finite difference time domain (FDTD) simulations are shown in FIG. 17. The parameter in the legend is the index of refraction of the index matching fluid. For a cantilever length of 160 μm, the coupling loss is only 0.4 dB at 1550 nm wavelength, representing the state-of-the-art.

Figure 18:
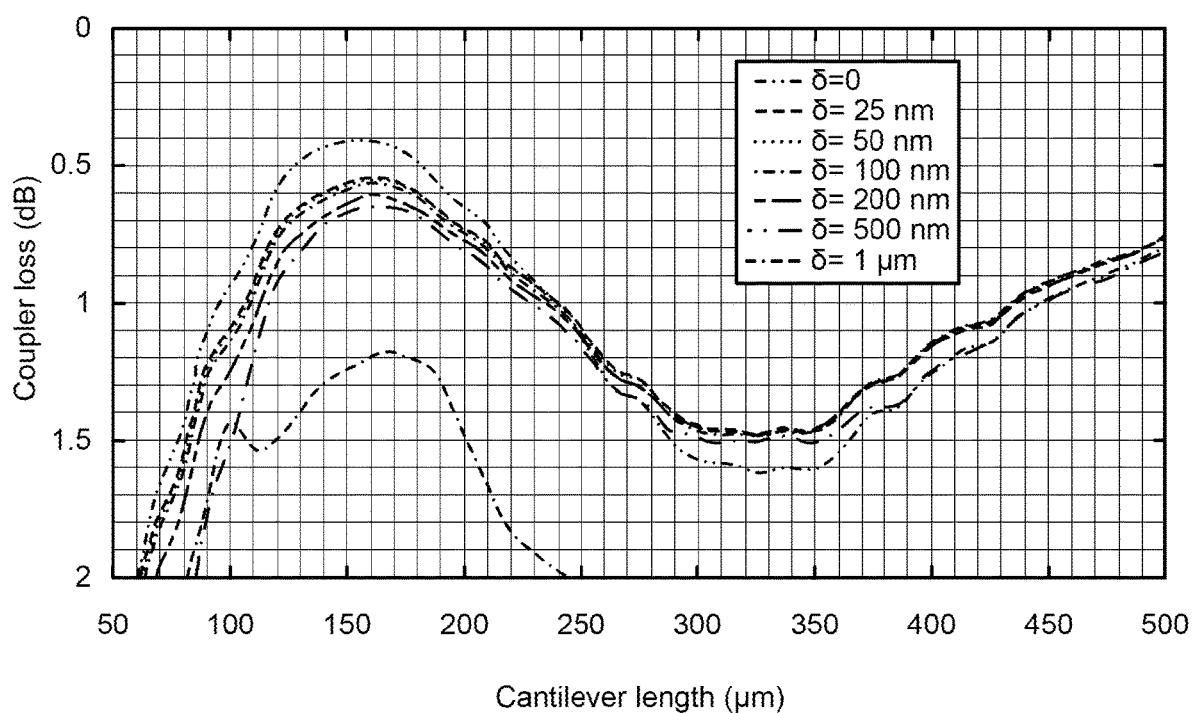
FIG. 18 shows three-dimensional modeling of coupling loss versus cantilever length with rib-to-slab lithographic alignment error as a parameter.

The alignment between the rib and the slab during fabrication is identified as a critical parameter. FIG. 18 shows three-dimensional modeling of coupling loss versus cantilever length with rib-to-slab lithographic alignment error as a parameter at 1550 nm wavelength. At a coupler length of 160 μm the coupling loss changes by less than 0.25 dB for rib-to-slab alignment error of up to 500 nm which is well within alignment capability of lithography.

Figure 19:
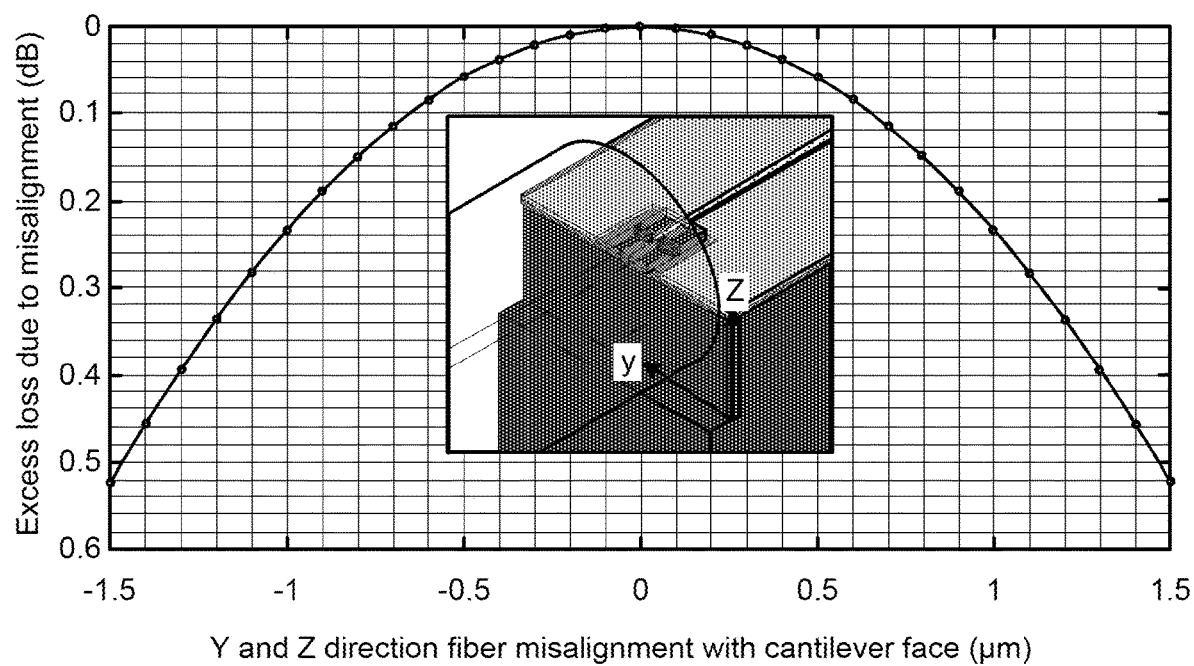
FIG. 19 shows three-dimensional modeling of coupling loss versus fiber to coupling facet misalignment.

The alignment between the SMF-28 fiber and the cantilever is also identified as a critical parameter. FIG. 19 shows three-dimensional modeling of coupling loss versus fiber misalignment with cantilever facet. As shown in FIG. 19, at a coupler length of 160 μm at 1550 nm wavelength, the excess coupling loss is 0.52 dB for 1.5 μm misalignment in either the vertical or lateral directions.

Figure 20:
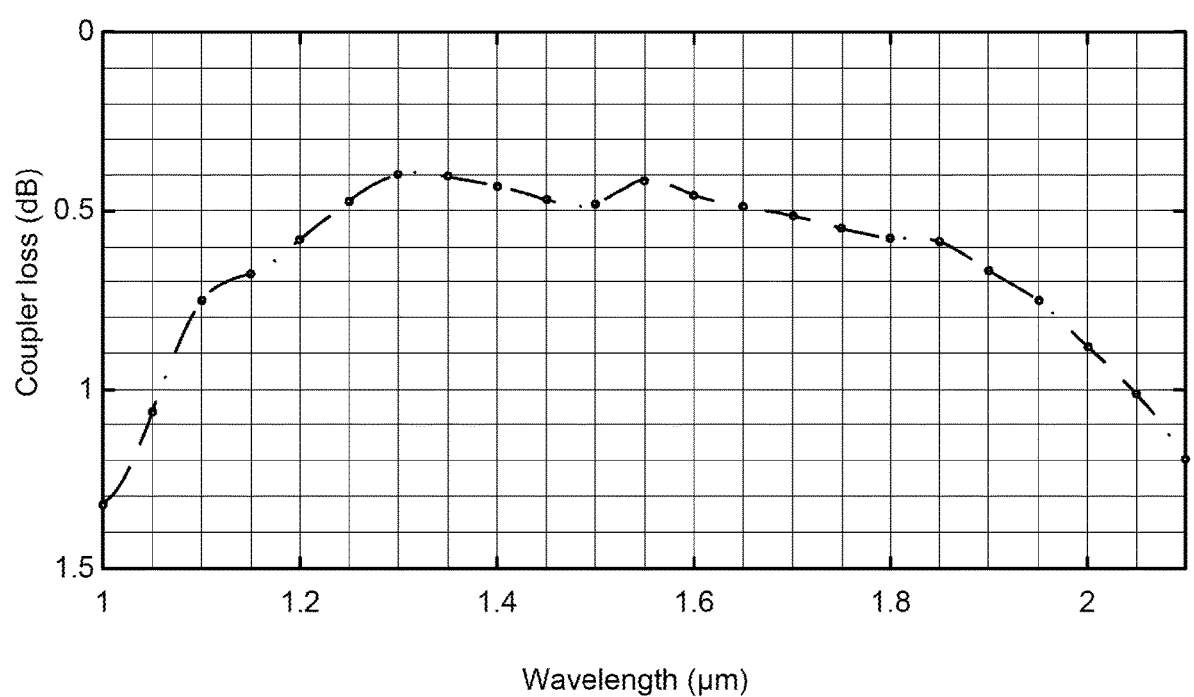
FIG. 20 shows three-dimensional modeling of coupler loss versus wavelength.

FIG. 20 shows three-dimensional modeling of coupler loss versus wavelength. The coupling loss varies by 0.4 dB from 1.35 μm to 1.75 μm. The fiber-to-chip coupler operates over a wide optical bandwidth.

With respect to fully packaged devices, packaged optical devices, electro-optical devices, and nonlinear optical devices, such as electro-optical modulators, are enclosed in aluminum casings with fiber pigtails and microwave/millimeter-wave co-axial connectors. Input and output 50/50 directional couplers are on the lower rib waveguides and straight parallel waveguides are on the upper rib waveguides. Design optimization is accomplished via electromagnetic modeling that is informed by experimental characterization of fabricated passive and active devices. Expected are $V_\pi L < 5$ V cm, 100 GHz EO bandwidth for 5 mm modulation length, 35 GHz EO bandwidth for 10 mm modulation length, and fiber-to-fiber loss of 7.7 dB. The fiber-to-fiber loss includes loss (with margin) from fiber-to-chip coupling (1 dB×2=2 dB), on-chip top waveguide propagation loss (0.2 dB/cm×5 mm=0.1 dB), on-chip bottom waveguide propagation loss (0.2 dB/cm×3 mm=0.06 dB), vertical coupler insertion loss (0.5 dB×4=2 dB), 50/50 splitter insertion loss (1 dB×2=2 dB), and fiber pigtail connector loss (0.75 dB×2=1.5 dB).

Figure 21A:
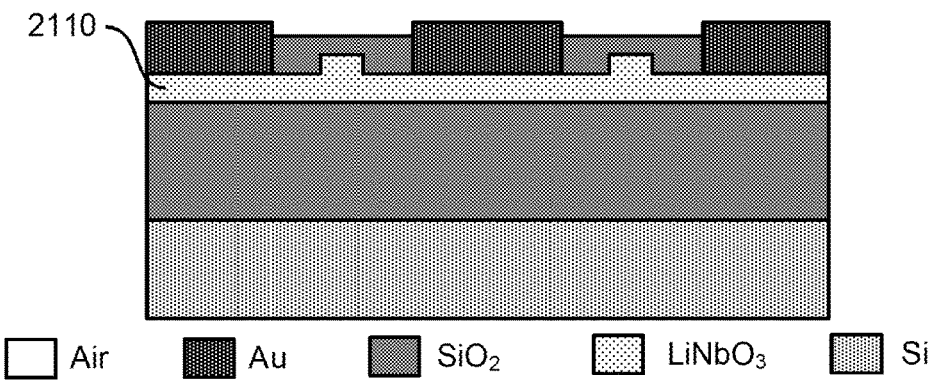
FIGS. 21A, 21B, and 21C, respectively show one, two, and three layers of ferroelectric on insulator.
Figure 21B:
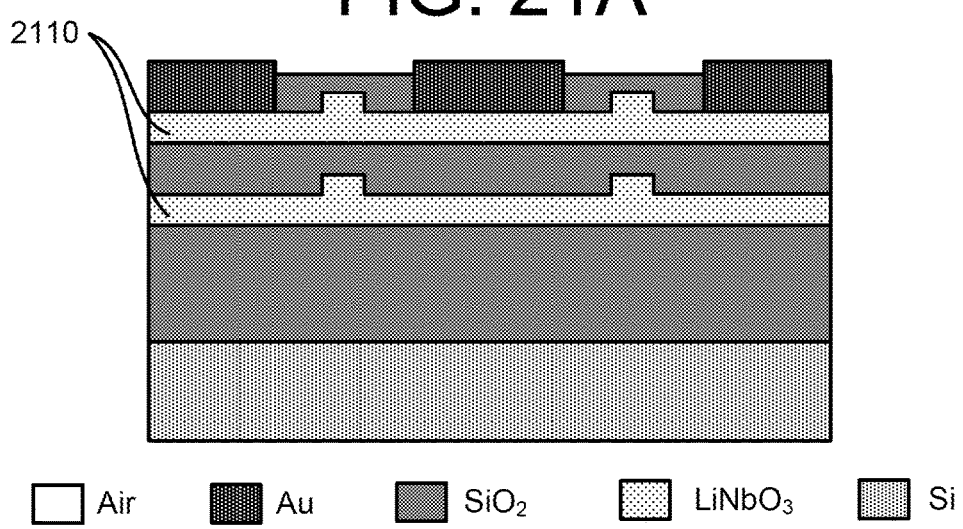
Figure 21C:
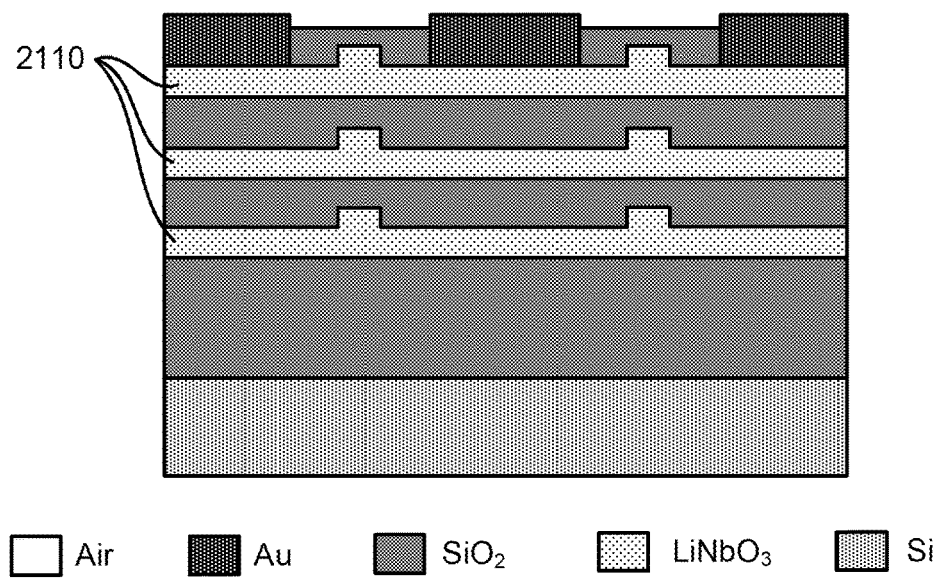

Generalizing, in the context of multi-layer ferroelectric on insulator waveguides, the number of optical waveguide layers can be one, two, or more. FIGS. 21A, 21B, and 21C, respectively show one, two, and three layers 2110 of ferroelectric on insulator. The presence of metal electrodes is optional. Also, the waveguide device in lithium niobate on insulator is not limited to electro-optical modulators. The waveguide device can also be a wavelength conversion device such as a second harmonic generator, a tunable lasing device such as an optical parametric oscillator, and also nonlinear optical devices based on sum frequency generation, difference frequency generation, optical rectification, and spontaneous parametric down conversion.

Generalizing, the electrodes can function as waveguides for high-frequency electrical signals, as in the case of co-planar waveguides (CPW) for the electro-optical modulator shown in FIG. 4A, as electrical contacts for introducing a DC bias for the modulator, or as poling electrodes for electrically tunable quasi-phase matched nonlinear optical devices such as wavelength converters and optical parametric oscillators. On-chip poling electrodes used to electrically control the nonlinear optical output by dynamically poling and un-poling benefit from the metal and optical waveguide crossings enabled by the multi-layer waveguides by providing flexibility in chip layout and access to chip edges for packaging.

Generalizing, the optical rib waveguide can be formed by depositing and patterning a thin film of a dielectric material such as silicon nitride. Such strip loading is an alternative to etching the rib in the ferroelectric.

Figure 22A:
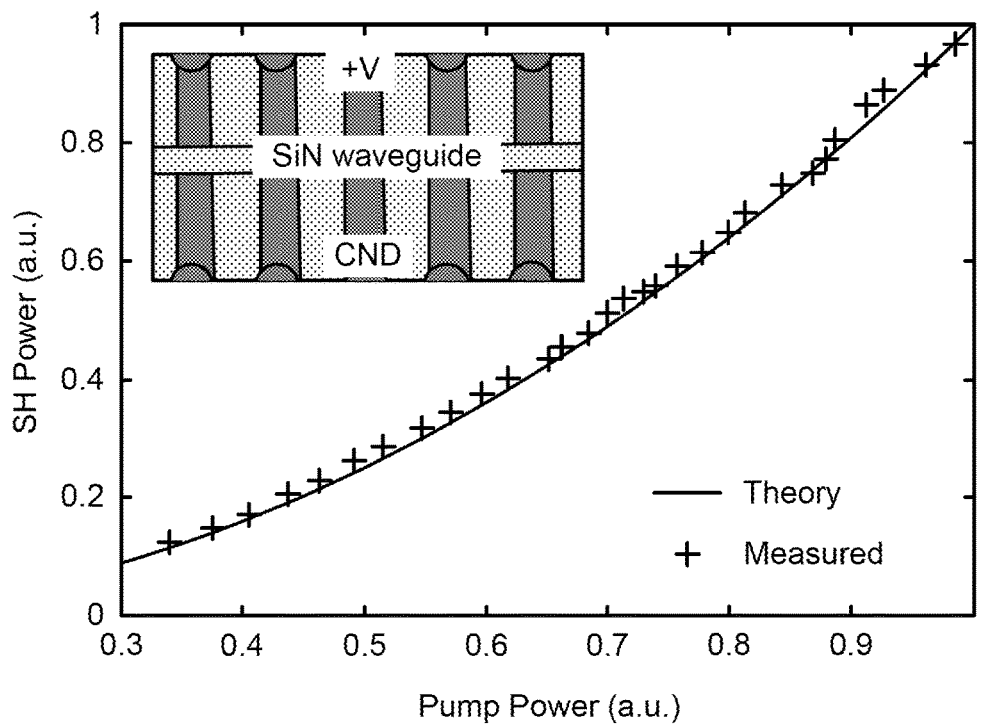
FIGS. 22A, 22B, and 22C, respectively show an example periodically poled wavelength conversion device and the optical modes at 1550 nm and 775 nm wavelengths.
Figure 22B:
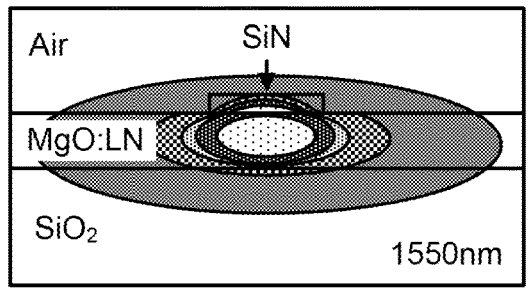
Figure 22C:
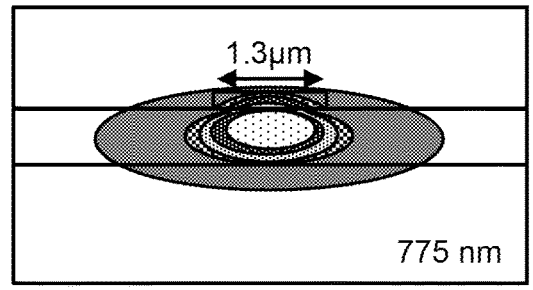

An example wavelength conversion device in the form of a second harmonic (SH) generator is shown in FIG. 22A. FIGS. 22A, 22B, and 22C, respectively show an example periodically poled wavelength conversion device and the optical modes at 1550 nm and 775 nm wavelengths. On-chip electrodes are used to periodically pole the lithium niobate for quasi-phase matching, resulting in alternating direction of the spontaneous polarization in the lithium niobate. The rib waveguide is formed by strip loading with silicon nitride. Experimental results show that the second harmonic power scales quadratically with the fundamental power, as expected from theory. The second harmonic generation efficiency is 600% $W^{-1}$ $cm^{-2}$. The on-chip electrodes allow for poling and for the electrical control of optical second harmonic output. The wavelength conversion device meets the need for developing efficient nonlinear optical waveguide components for classical and quantum communications applications. In the context of quantum information science and technology, components and transducers that can interconnect quantum bits (qubits) based on, for example, superconducting circuits or trapped ions, to standard optical fiber are needed to create hybrid quantum networks, distributed quantum computers, and technology for long distance communication over the future quantum internet.

Generalizing, in the context of multi-layer ferroelectric on insulator waveguide fabrication, the donor wafer can be undoped LN or doped LN with magnesium oxide (MgO) to reduce photorefractive damage. The donor wafer can also be another ferroelectric material such as potassium titanyl phosphate $KTiOPO_4$ (KTP). The handle wafer 615 is silicon in FIG. 6 but can also be a wafer of another material such as lithium niobate, KTP, quartz, sapphire, or silicon carbide. In the case of a silicon handle wafer, the silicon wafer is oxidized to produce a silicon dioxide ($SiO_2$) layer. For handle wafers composed of other materials such as lithium niobate, KTP, quartz, sapphire, or silicon carbide, an insulating layer, such as a silicon oxide layer, is deposited on the handle wafer. The insulating layer is optional for handle wafers, such as quartz and sapphire, that possess indices of refraction less than the index of refraction of lithium niobate. Furthermore, the LN thin film thickness can range from a monolayer to 10 µm, the silicon dioxide layer can range from a monolayer to 10 µm, and the silicon handle thickness can range from 50 µm to 1000 µm or more. Post fabrication, the silicon substrate handle can be removed by, for example, wet etching, for flexible photonic device applications.

Generalizing, in the context of multi-layer ferroelectric on insulator waveguide design and fabrication, one layer of waveguides can be composed of a material of one type of crystal cut that is different than the crystal cut of the other waveguide layer. For example, the top waveguide layer can be x-cut lithium niobate and the bottom waveguide layer can be z-cut lithium niobate, or vice-versa.

Figure 23:
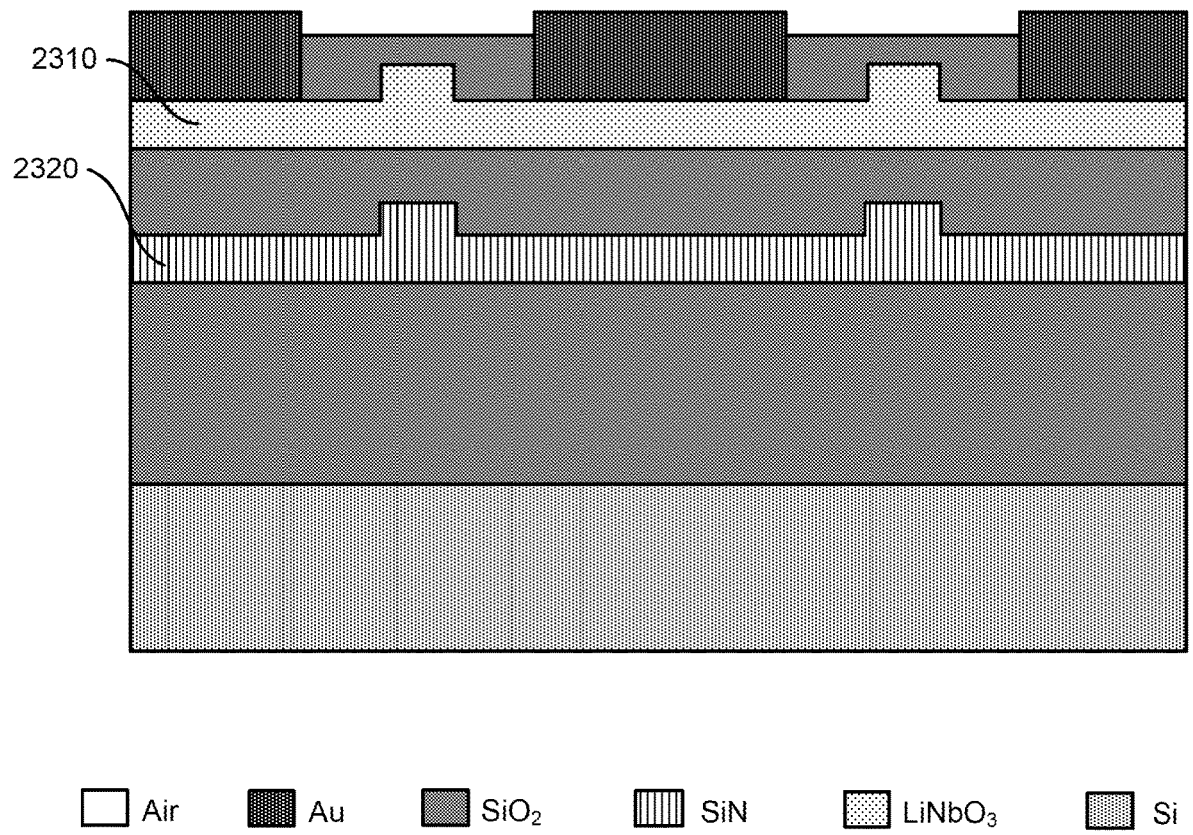
FIG. 23 is an illustration of an implementation of an electro-optical modulator cross-section with silicon nitride.

Generalizing, in the context of multi-layer ferroelectric on insulator waveguide design and fabrication, one layer of waveguides can be composed of a material other than a ferroelectric. For example, for an electro-optical modulator, the bottom layer of waveguides can be composed of silicon nitride or silicon. FIG. 23 is an illustration of an implementation of an electro-optical modulator 2300 cross-section with silicon nitride. FIG. 23 shows a top waveguide layer 2310 is lithium niobate and the bottom waveguide layer 2320 is silicon nitride. The bottom waveguide layer 2320 is passive. Vertical coupling occurs most efficiently when the mode propagation constants of two waveguides are the same. Silicon nitride can exhibit an index of refraction similar to lithium niobate. Both index of refraction and waveguide geometry determine the mode propagation constant. When silicon nitride or silicon is used as the bottom waveguide layer 2320, the fiber-to-chip coupler is based on silicon nitride or silicon waveguides.

Generalizing, in the context of vertical directional coupling, the design of two waveguides involved in vertical directional coupling can exploit adiabatic tapers or two different lateral and vertical waveguide cross-sectional dimensions to reduce the fabrication tolerance required for efficient vertical directional coupling. A resonator, such as a ring or disk resonator, can be sandwiched between the two vertical waveguides in order to introduce frequency selectivity to the vertical coupling. Waveguide gratings can also be utilized to achieve vertical coupling.

Figure 24:
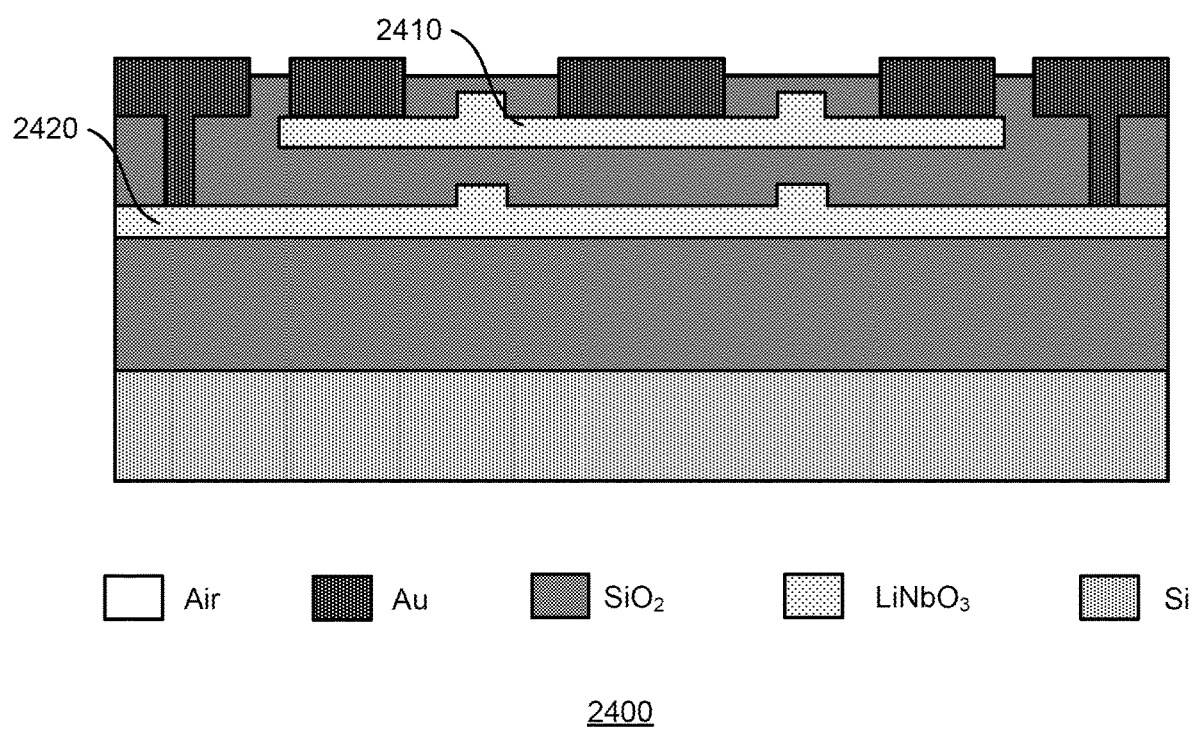
FIG. 24 is an illustration of an implementation of an electro-optical modulator cross-section with electrical contacts to both lithium niobate layers.

Generalizing, in the context of vertical directional coupling, when silicon nitride is used for a waveguide layer, forming silicon nitride rib or strip waveguides, the optical functionality can be passive, or can be based on properties, such as third order nonlinearities, inherent to silicon nitride. When lithium niobate is used for a waveguide layer, forming lithium niobate strip or rib waveguides, the optical nonlinearity can be exploited for voltage control of optical phase, such as in the case of the electro-optic effect, or for general nonlinear optical effects, such as in the case of wavelength conversion, and wave mixing. Additional electrodes can be used to access the electro-optic effect or optical nonlinearity in the bottom waveguide 2420, illustrated in FIG. 24. FIG. 24 is an illustration of an implementation of an electro-optical modulator 2400 cross-section with electrical contacts to both lithium niobate layers. In FIG. 24, the top waveguide layer 2410 is lithium niobate and the bottom waveguide layer 2420 is lithium niobate. The layers 2410, 2420 are optical active via electro-optic effect and nonlinear optical effects. Additional electrodes can be used to control the optical phase in the bottom waveguide.

Generalizing, in the context of fiber-to-chip couplers, an example of standard optical fiber is SMF-28, used for optical telecommunications in the optical C-band between 1530 nm and 1565 nm wavelength. Another example is polarization maintaining fiber typically packaged with electro-optical modulators. A third example is optical fiber designed for operation in the visible wavelength regime. Physical dimensions shown in FIG. 16 are for operation in the optical C-band. Parameters may be optimized for operation at other wavelength bands, such as wavelengths near 1310 nm, and wavelengths in the range of visible light less than 1000 nm. For example, in a wavelength conversion device, one fiber-to-chip coupler can be designed for operation at 1550 nm and the second fiber-to-chip coupler can be designed for operation at 775 nm. Furthermore, alternatively, the rib waveguide in the coupler can be formed by depositing and patterning a thin film of a dielectric material such as silicon nitride. Such strip loading is an alternative to etching the rib in the ferroelectric.

Figure 25:
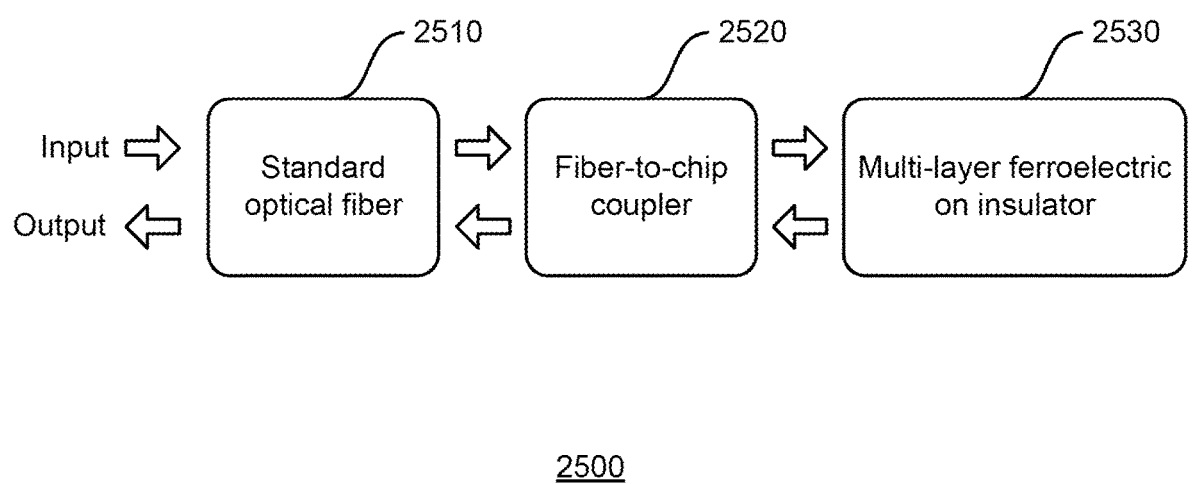
FIG. 25 is an illustration of an implementation of a fiber-to-fiber system for multi-layer ferroelectric on insulator waveguide devices where a single physical optical fiber functions as the input and the output fiber.

Generalizing, in the context of fiber-to-fiber platform for multi-layer ferroelectric on insulator waveguide devices, the input fiber can also serve as the output fiber. In this case, there is only one fiber-to-chip coupler. The multi-layer ferroelectric on insulator device produces a back reflection so that the output fiber is the same as the input fiber, illustrated in FIG. 25. FIG. 25 is an illustration of an implementation of a fiber-to-fiber system 2500 for multi-layer ferroelectric on insulator 2530 waveguide devices where a single physical optical fiber 2510 functions as the input and the output fiber. FIG. 25 shows a single fiber-to-chip coupler 2520 configuration can be used where one optical fiber 2510 hosts the input and output light. In another configuration, the multi-layer ferroelectric on insulator device produces no back reflection so the output light propagates into free-space.

In an implementation, a system comprises: a first fiber-to-chip coupler configured to receive light from a first optical fiber; a plurality of multi-layer ferroelectric on insulator optical waveguides; and a second fiber-to-chip coupler configured to output light to a second optical fiber, wherein the multi-layer ferroelectric on insulator waveguides are coupled between the first fiber-to-chip coupler and the second fiber-to-chip coupler.

Implementations may include some or all of the following features. The multi-layer ferroelectric on insulator waveguides comprise at least one ferroelectric on insulator waveguide, such as a lithium niobate on insulator (LNOI) waveguide. The multi-layer ferroelectric on insulator waveguides comprise multi-layer coupled waveguides that allow light to be coupled vertically from a ferroelectric waveguide on one level to a ferroelectric waveguide on another level. The first fiber-to-chip coupler is configured to allow light to be coupled from a single mode optical fiber into a ferroelectric on insulator waveguide, and the second fiber-to-chip coupler is configured to allow light to be coupled from a ferroelectric on insulator waveguide into a second single mode optical fiber. The multi-layer ferroelectric on insulator waveguides are integrated with electrodes to implement an optical device, an electro-optical device, or a non-linear optical device, such as an electro-optical modulator, with microwave and optical waveguide crossings, and electrical interconnects, compatible with packaging. One physical optical fiber functions as both the input and the output optical fibers, and one physical fiber-to-chip coupler functions as both the input and output fiber-to-chip couplers.

In an implementation, a system comprises: a first fiber-to-chip coupler configured to receive light from a first optical fiber; a plurality of multi-layer ferroelectric on insulator optical waveguides and non-ferroelectric on insulator waveguides; and a second fiber-to-chip coupler configured to output light to a second optical fiber, wherein the multi-layer ferroelectric on insulator optical waveguides and the non-ferroelectric on insulator optical waveguides are coupled between the first fiber-to-chip coupler and the second fiber-to-chip coupler.

Implementations may include some or all of the following features. The multi-layer ferroelectric on insulator waveguides comprise multi-layer coupled waveguides that allow light to be coupled vertically from a ferroelectric waveguide on one level to a non-ferroelectric waveguide on another level. The first fiber-to-chip coupler is configured to allow light to be coupled from a single mode optical fiber into a ferroelectric on insulator waveguide, or into a non-ferroelectric on insulator waveguide, and the second fiber-to-chip coupler is configured to allow light to be coupled from a ferroelectric on insulator waveguide into a single mode optical fiber, or coupled from a non-ferroelectric on insulator waveguide into a single mode optical fiber. The multi-layer ferroelectric and non-ferroelectric on insulator waveguides are integrated with electrodes to implement an optical device, an electro-optical device, or a non-linear optical device, such as an electro-optical modulator, with microwave and optical waveguide crossings, and electrical interconnects, compatible with packaging. One physical optical fiber functions as both the input and the output optical fibers, and one physical fiber-to-chip coupler functions as both the input and output fiber-to-chip couplers.

In an implementation, a method comprises: forming a first insulating layer on a handle wafer; implanting a donor wafer with ions to form a damage layer beneath the surface; bonding the donor wafer and the handle wafer; annealing the bonded wafers to exfoliate a first film along the ion implant damage layer; forming a second insulating layer on the first film; implanting a donor wafer with ions to form a damage layer beneath the surface; bonding the donor wafer to the second insulating layer on the first film; and annealing the bonded wafers to exfoliate a second film along the ion implant damage layer.

Implementations may include some or all of the following features. The donor wafer is a ferroelectric wafer, such as a lithium niobate wafer. The method further comprises patterning the thin film of the ferroelectric to form optical waveguides. The method further comprises pattering electrodes and/or microwave waveguides in proximity to the first and/or second films. At least one of the handle wafer or the donor wafer are die. The bow of the handle is matched to the bow of the donor. A non-ferroelectric thin film material is formed on the first or second insulating layers by deposition, in lieu of exfoliation, resulting in one ferroelectric thin film and one non-ferroelectric thin film. The ferroelectric and non-ferroelectric thin films are patterned into optical waveguides. The process is repeated to form multi-layer optical waveguides where the number of waveguide layers is greater than two.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   a first fiber-to-chip coupler configured to receive light from a first optical fiber;
   a plurality of multi-layer ferroelectric on insulator optical waveguides; and
   a second fiber-to-chip coupler configured to output light to a second optical fiber, wherein the multi-layer ferroelectric on insulator waveguides are coupled between the first fiber-to-chip coupler and the second fiber-to-chip coupler,
   wherein the multi-layer ferroelectric on insulator waveguides comprise multi-layer coupled waveguides that allow light to be coupled vertically from a ferroelectric waveguide on one level to a non-ferroelectric waveguide on another level.

2. The system of claim 1, wherein the first fiber-to-chip coupler is configured to allow light to be coupled from a single mode optical fiber into a ferroelectric on insulator waveguide, and the second fiber-to-chip coupler is configured to allow light to be coupled from a ferroelectric on insulator waveguide into a second single mode optical fiber.

3. The system of claim 1, wherein the multi-layer ferroelectric on insulator waveguides are integrated with electrodes to implement an optical device, an electro-optical device, or a non-linear optical device, such as an electro-optical modulator, with microwave and optical waveguide crossings, and electrical interconnects, compatible with packaging.

4. The system of claim 1, wherein one physical optical fiber functions as both the input and the output optical fibers, and one physical fiber-to-chip coupler functions as both the input and output fiber-to-chip couplers.

5. A system comprising:
   a first fiber-to-chip coupler configured to receive light from a first optical fiber;
   a plurality of multi-layer ferroelectric on insulator optical waveguides and non-ferroelectric on insulator waveguides; and
   a second fiber-to-chip coupler configured to output light to a second optical fiber, wherein the multi-layer ferroelectric on insulator optical waveguides and the non-ferroelectric on insulator optical waveguides are coupled between the first fiber-to-chip coupler and the second fiber-to-chip coupler,
   wherein the multi-layer ferroelectric on insulator waveguides comprise multi-layer coupled waveguides that allow light to be coupled vertically from a ferroelectric waveguide on one level to a non-ferroelectric waveguide on another level.

6. The system of claim 5, wherein the multi-layer ferroelectric on insulator waveguides comprise at least one ferroelectric on insulator waveguide, such as a lithium niobate on insulator (LNOI) waveguide.

7. The system of claim 5, wherein the first fiber-to-chip coupler is configured to allow light to be coupled from a single mode optical fiber into a ferroelectric on insulator waveguide, or into a non-ferroelectric on insulator waveguide, and the second fiber-to-chip coupler is configured to allow light to be coupled from a ferroelectric on insulator waveguide into a single mode optical fiber, or coupled from a non-ferroelectric on insulator waveguide into a single mode optical fiber.

8. The system of claim 5, wherein the multi-layer ferroelectric and non-ferroelectric on insulator waveguides are integrated with electrodes to implement an optical device, an electro-optical device, or a non-linear optical device, such as an electro-optical modulator, with microwave and optical waveguide crossings, and electrical interconnects, compatible with packaging.

9. The system of claim 5, wherein one physical optical fiber functions as both the input and the output optical fibers, and one physical fiber-to-chip coupler functions as both the input and output fiber-to-chip couplers.

* * * * *